US008880316B2

(12) United States Patent
Nishikawa

(10) Patent No.: US 8,880,316 B2
(45) Date of Patent: Nov. 4, 2014

(54) CONTROL APPARATUS FOR VEHICLE

(75) Inventor: Norihisa Nishikawa, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 325 days.

(21) Appl. No.: 13/509,959

(22) PCT Filed: Apr. 14, 2010

(86) PCT No.: PCT/JP2010/056715
§ 371 (c)(1),
(2), (4) Date: May 15, 2012

(87) PCT Pub. No.: WO2011/128999
PCT Pub. Date: Oct. 20, 2011

(65) Prior Publication Data
US 2012/0226417 A1    Sep. 6, 2012

(51) Int. Cl.
*B60W 30/12* (2006.01)
*B60T 8/00* (2006.01)

(52) U.S. Cl.
USPC ............................................. 701/71; 701/41

(58) Field of Classification Search
CPC ........ B60W 30/12; B60T 8/00; B60T 8/1755; B62D 5/005; B62D 6/00; B62D 7/14
USPC .................. 701/71, 41, 42, 73, 82, 89, 90, 91
See application file for complete search history.

(56) References Cited

U.S. PATENT DOCUMENTS

| 2005/0216161 A1* | 9/2005 | Sakugawa ........................ 701/70 |
| 2011/0264329 A1* | 10/2011 | Limpibunterng et al. ...... 701/41 |
| 2012/0215406 A1* | 8/2012 | Tanimoto et al. ............... 701/42 |

FOREIGN PATENT DOCUMENTS

| JP | 03-292221 A | 12/1991 |
| JP | 06-336169 A | 12/1994 |
| JP | 2002-370664 A | 12/2002 |
| JP | 2007-283881 A | 11/2007 |
| JP | 2008-100579 A | 5/2008 |

* cited by examiner

*Primary Examiner* — Tan Q Nguyen
(74) *Attorney, Agent, or Firm* — Sughrue Mion, PLLC

(57) ABSTRACT

When various automatic steering is performed, a steering reaction transmitted from steered wheels is suppressed without making it interfere with a driver's steering input. A control apparatus (100) for controlling a vehicle (10), the vehicle provided with: a tire steer angle varying device (400, 800) capable of changing a tire steer angle of at least one wheel of front wheels and rear wheels independently of a driver's operation for promoting a change in the tire steer angle; and a braking/driving force varying device (300, 600) capable of changing a left-right braking/driving force difference of the at least one wheel is provided with: a setting device for setting a target value of a vehicle state quantity for defining a target motion state of the vehicle; and a determining device for determining a target value of the tire steer angle of the front wheels or the rear wheels and target values of left-right braking/driving forces of the front wheels or the rear wheels such that the vehicle state quantity has the set target value and such that a steering reaction torque has a predetermined target value, on the basis of a relative relation between: the steering reaction toque and the vehicle state quantity; and the tire steer angle and the left-right braking/driving force difference.

12 Claims, 5 Drawing Sheets

FIG. 4
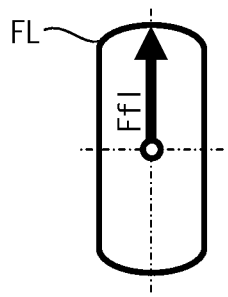
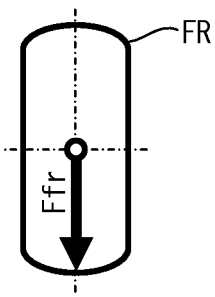
(a)
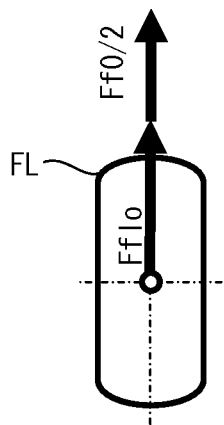
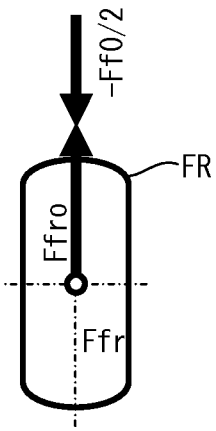
(b)
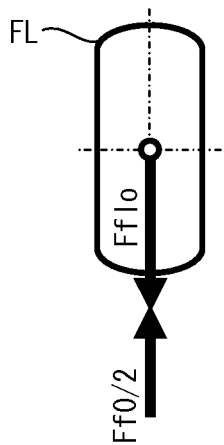
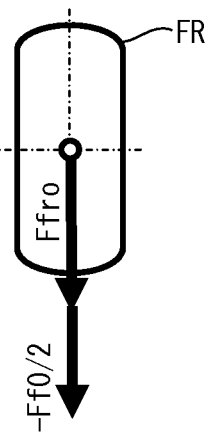
(c)

CONTROL APPARATUS FOR VEHICLE

TECHNICAL FIELD

The present invention relates to a control apparatus for a vehicle, which can be applied to a vehicle provided with various automatic operating functions such as, for example, Lane Keeping Assist (LKA: steering assist for lane keeping driving).

BACKGROUND ART

As a control method similar to this type of apparatus, there has been suggested a method of controlling an automatic steering apparatus provided with a motor 1 for controlling a tire steer angle and a motor 2 for controlling a steering torque (for example, refer to a patent document 1). According to the method of controlling the automatic steering apparatus disclosed in the patent document 1, a steering reaction generated by automatic steering can be canceled by using the torque of the motor 2 described above.

Incidentally, there has been also suggested an apparatus for controlling the braking/driving force of each wheel such that the yaw rate of a vehicle is a target yaw rate (refer to a patent document 2).

PRIOR ART DOCUMENT

Patent Document

Patent document 1: Japanese Patent Application Laid Open No. Hei 6-336169
Patent document 2: Japanese Patent Application Laid Open No. Hei 3-292221

DISCLOSURE OF INVENTION

Subject to be Solved by the Invention

The steering torque is a factor for influencing a steering operation which is intentionally performed by a driver. Therefore, if the steering reaction generated in performing this type of automatic steering is canceled by the steering torque, the steering torque generated by the driver performing the steering operation on the basis of the driver's intention interferes with a torque for canceling the steering reaction and this makes the driver feel uncomfortable in some cases.

In other words, the method in the patent document 1 has such a technical problem that it is hard to cancel the steering reaction generated by the automatic steering without giving the uncomfortable feeling to the driver.

Moreover, according to the method in the patent document 1, an assist torque for canceling the steering reaction is operated or calculated on the basis of the steering torque detected in accordance with the steering reaction. In other words, the steering reaction is estimated after it is actualized as a detectable degree of steering torque.

In other words, the method in the patent document 1 has also such a technical problem that the steering reaction remains without being canceled throughout a significant period to the extent that the driver can perceive it because the steering reaction can be detected only as an actual phenomenon.

Those technical problems can occur in the same manner even in applying the technology disclosed in the patent document 2, which neither mentions nor indicates the steering reaction even though it realizes the automatic steering by using the braking/driving force.

In view of the aforementioned problems, it is therefore an object of the present invention to provide a control apparatus for a vehicle capable of suppressing a steering reaction transmitted from steered wheels without making it interfere with a driver's steering input when various types of automatic steering is performed.

Means for Solving the Subject

The above object of the present invention can be achieved by a control apparatus for controlling a vehicle, the vehicle provided with: a tire steer angle varying device capable of changing a tire steer angle of at least one wheel of front wheels and rear wheels independently of a driver's operation for promoting a change in the tire steer angle; and a braking/driving force varying device capable of changing a left-right braking/driving force difference of the at least one wheel, the control apparatus provided with: a setting device for setting a target value of a vehicle state quantity for defining a target motion state of the vehicle; and a determining device for determining a target value of the tire steer angle of the front wheels or the rear wheels and target values of left-right braking/driving forces of the front wheels or the rear wheels for defining the left-right braking/driving force difference such that the vehicle state quantity has the set target value and such that a steering reaction torque has a predetermined target value, on the basis of a vehicle motion model set in advance for defining a relative relation between: the steering reaction toque transmitted to a steering apparatus from steered wheels coupled with the steering apparatus and the vehicle state quantity; and state controlled variables including the tire steer angle and the left-right braking/driving force difference.

The vehicle of the present invention is provided with the tire steer angle varying device and the braking/driving force varying device.

The tire steer angle varying device is a device capable of changing the tire steer angle of the front wheels or the rear wheels or both of them independently of the driver's operation for promoting the change in the tire steer angle. The driver's operation preferably means the operation of various steering inputting devices such as a steering wheel. Therefore, according to the tire steer angle varying device, even if a driver takes his hands off the steering wheel or even if the driver only retains the steering, it is possible to change the tire steer angle to a desired value.

In other words, the tire steer angle varying device is different in the essential meaning from the normal steering mechanism for following a mechanical transmission path from the aforementioned steering inputting device to the steered wheels (preferably, the front wheels). However, from the viewpoint of a physical configuration, at least one portion of the tire steer angle varying device may be shared or owned in common with this type of steering mechanism. The tire steer angle varying device can adopt various practical aspects such as a Variable Gear Ratio Steering (VGRS), or an Active Rear Steering (ARS), or both of them, as a preferred form.

According to the tire steer angle varying device, regarding the wheels which are the control targets of the tire steer angle (which can include the steered wheels as the wheels mechanically coupled with the aforementioned steering inputting device), the tire steer angle is variable at least in a certain range. Thus, in theory, the moving direction of the vehicle can be changed regardless of the driver's steering input.

The braking/driving force varying device is a device capable of changing the left-right braking/driving force difference of the front wheel or the rear wheels or both of them (which is a difference between the braking/driving forces of the left and right wheels). The braking/driving force varying device can adopt practical aspects such as, for example, various driving force varying devices including a driving force distribution differential mechanism, an in-wheel motor system, or the like, various braking force varying apparatuses including various Electronic Controlled Braking systems (ECBs) including an Antilock Braking System (ARS), or both of them, as a preferred form. Incidentally, the expression "capable of changing the left-right braking/driving force difference" namely means "capable of changing the braking/driving forces of the left and right wheels independently of each other" in a uniform or unambiguous manner.

If the braking/driving force varying device is a driving force varying device, after a torque supplied from various power sources such as, for example, an internal combustion engine (incidentally, the torque and the driving force can have a unique or unambiguous relation) is distributed to the front and rear wheels at a fixed or variable distribution ratio, the torque distributed to each of the front and rear wheels is further distributed to the left and right wheels at a desired distribution ratio. As a result, the absolute values of the driving forces of the left and right wheels are increase/decrease-controlled, which can cause the left-right driving force difference.

Moreover, if the braking/driving force varying device is a braking force varying device, a braking force preferably as a friction braking force which is applied to the left and right wheels is made variable, by which it is possible to obtain the same effect as relatively increasing the driving force, regarding the wheel on the side having a smaller braking force applied.

In any case, if there is the braking/driving force difference between the left and right wheels, the vehicle turns to the side of the wheel having a relatively small driving force (i.e. the wheel having a relatively large braking force) (i.e. the right side if the driving force (braking force) of the right side wheel is small (large)). Therefore, according to the braking/driving force varying device, in theory, it is possible to change the moving direction of the vehicle independently of the driver's steering input.

The control apparatus for the vehicle of the present invention is an apparatus for controlling such a vehicle and can adopt forms of various computer systems such as various processing units like a single or a plurality of Electronic Control Units (ECUs) or the like, various controllers or microcomputer apparatuses, which can include one or a plurality of Central Processing Units (CPUs), Micro Processing Units (MPUs), various processors or various controllers, or various memory devices such as a Read Only Memory (ROM), a Random Access Memory (RAM), a buffer memory or a flush memory, as occasion demands.

According to the control apparatus for the vehicle of the present invention, in its operation, the target value of the vehicle state quantity corresponding to the target motion state of the vehicle is set by the setting device.

The "vehicle state quantity" of the present invention is the state quantity of the vehicle which can exert a practically useful effect in realizing the target motion state, and it is a state quantity capable of defining the turning behavior of the vehicle as a preferred form. For example, this vehicle state quantity means a yaw rate, a vehicle body slip angle (which is an angle with respect to the turning tangential direction of the vehicle and an angle between the direction of a vehicle body and the instantaneous moving direction of the vehicle body), or lateral acceleration, or the like, as a preferred form.

The setting device sets the target value of the vehicle state quantity, for example, on the basis of a positional state deviation as a physical quantity which can be a reference value for driving the vehicle along a target driving route (i.e. which is a deviation for defining a relative positional relation between the target driving route to be maintained and the vehicle, and which can include the deviation of the lateral position of the vehicle with respect to the target driving route, a yaw angle deviation, or the like as a preferred form), or moreover, with respect to a driving condition such as a vehicle speed. At this time, the target value may be mapped in a form corresponding to various parameter values and stored in a proper memory device in advance, or it may be derived in accordance with a proper arithmetic algorithm, an arithmetic expression, or the like at each time.

On the other hand, if the turning behavior of the vehicle is controlled by controlling the vehicle state quantity to have the target value set by the setting device and a vehicle motion is maintained in or brought close to the aforementioned target motion state by a type of automatic steering, the steering reaction torque represented by the self-aligning torque of the steered wheels or the like can act on the steering apparatus as a device for transmitting the steering input to the steered wheels, which includes the steering inputting device such as a steering wheel and the aforementioned steering mechanism.

The steering reaction torque can be a so-called "response" of steering if the driver gives a steering retention force to the steering inputting device. However, since vehicle motion control for the target motion state is a type of automatic steering which can be performed independently of the driver's steering intention (of course, the control itself may be started on the driver's intention), the steering reaction torque easily gives the uncomfortable feeling to the driver. Moreover, the steering reaction torque is a reaction torque for rotating the steering inputting device in a direction opposite to the original turning direction. Thus, in so-called hands-free driving in which the driver does not give the steering retention force, the vehicle motion control can be influenced by the turning of the steering inputting device in the opposite turning direction.

By the way, according to a known equation of vehicle motion, the degree of freedom of the vehicle state quantity is equal to the number of the state controlled variables which can be independently controlled. Therefore, if the purpose is to provide at least one degree of freedom for the turning behavior of the vehicle (i.e. to control the vehicle motion to be in the target motion state) while providing controllability for the steering reaction torque (i.e. to realize a vehicle motion with two degrees of freedom), at least two state controlled variables of the vehicle are required.

Here, if the vehicle is provided with the tire steer angle varying device and the braking/driving force varying device, a combination of the tire steer angle of the front wheels or the rear wheels and the left-right braking/driving force difference of the front wheels or the rear wheels (i.e. a combination of the front wheel tire steer angle and the front wheel left-right braking/driving force difference, a combination of the front wheel tire steer angle and the rear wheel left-right braking/driving force difference, a combination of the rear wheel tire steer angle and the front wheel left-right braking/driving force difference, and a combination of the rear wheel tire steer angle and the rear wheel left-right braking/driving force difference) can be used as this type of state controlled variables. By setting them as the state controlled variables, it is possible to realize the vehicle motion with two degrees of freedom.

Here, particularly in the present invention, the relative relation between the vehicle state quantity and the state controlled variables is given as the vehicle motion model established on the basis of the aforementioned equation of motion in advance. This vehicle motion model is preferably used for a process of determining the target value of the tire steer angle and the target value of the braking/driving force by using the determining device.

In other words, the determining device determines the target value of the tire steer angle of the front wheels or the rear wheels and the target values of the braking/driving forces of the front wheels or the rear wheels such that the vehicle state quantity has the set target value and such that the steering reaction torque has the predetermined target value, on the basis of the vehicle motion model.

Incidentally, factors for causing the left-right braking/driving force difference on the braking/driving force varying device are the braking/driving forces of the left and right wheels; however, the solution (target values) of the braking/driving forces of the left and right wheels corresponding to the solution (target value) of the braking/driving force difference, which satisfies the conditions of the vehicle state quantity and the steering reaction torque and which is obtained on the basis of the aforementioned motion model, is not necessarily unique or unambiguous. Therefore, the determining device may determine the target values of the braking/driving forces of the left and right wheels to be an optimal solution according to the driving condition of the vehicle and the driver's intention or the like at that time point, in the range of satisfying the target value of the left-right braking/driving force difference.

According to the control apparatus for the vehicle of the present invention, each of the target value of the tire steer angle of the front wheels or the rear wheels and the target values of the braking/driving forces of the front wheels or the rear wheels is determined as described above, by which if the tire steer angle varying device and the braking/driving force varying device are controlled so as to obtain the determined target values, the vehicle motion can be maintained in or brought close to the target motion state while obtaining a desired steering reaction.

Incidentally, it is obvious that the wheels (front wheels or rear wheels) for which the target value of the tire steer angle is determined by the determining device mean the wheels which are the control targets of the tire steer angle of the tire steer angle varying device. Moreover, in the same manner, it is obvious that the wheels (front wheels or rear wheels) for which the target value of the braking/driving force is determined by the determining device mean the wheels which are the control targets of the braking/driving force of the braking/driving force varying device.

In the control apparatus for the vehicle of the present invention, the target value of the steering reaction torque may be a fixed value or a variable value. If it is the variable value, its relation with parameters may be defined by a map or the like. Alternatively, the target value of the steering reaction torque may be set individually and specifically at each time, on the basis of an algorithm prepared in advance.

Here, if the desired steering reaction torque can be obtained, a reduction in drivability is dramatically suppressed in comparison with a case where some steering reaction torque is generated in the course of the vehicle motion control for the target motion state. This is because the target value of the steering reaction torque can be foreseen on the driver's side or can be set so as not to make the driver feel uncomfortable.

Moreover, in particular, if the steering reaction torque has a value corresponding to zero (which includes at least a value of zero and which is preferably conceptually includes a value defined not to be perceived by the driver as the deterioration of the drivability on the basis of experiments, experiences, theories, simulations or the like in advance), the steering reaction torque is substantially canceled, and the so-called hands-free driving can be realized.

Moreover, since the control apparatus for the vehicle of the present invention can obtain the desired steering reaction torque from the change in the tire steer angle and the braking/driving force difference, an electronically-controlled power steering apparatus such as an Electronic-controlled Power Steering (EPS) is not required in obtaining the desired steering reaction torque.

Therefore, there is no problem even if the power steering apparatus as a steering load reducing apparatus for assisting the driver's driving operation is a hydraulically-controlled power steering apparatus, which is less responsive than the electrically-controlled power steering apparatus. This is because the relatively low responsiveness of the hydraulic-controlled type is not actualized for the purpose of reducing a steering load and it is possible to preferably receive only practical benefits, such as a reduction in cost and a reduction in an electrical load.

In one aspect of the control apparatus for the vehicle of the present invention, it is further provided with a controlling device for performing automatic steering control in which the tire steer angle varying device and the braking/driving force varying device are controlled such that the tire steer angle of the front wheels or the rear wheels and the left-right braking/driving forces of the front wheels or the rear wheels have the determined target values.

According to this aspect, the automatic steering control is performed by the controlling device, and each of the tire steer angle of the front wheels or the rear wheels and the braking/driving forces of the front wheels or the rear wheels is controlled to have the determined target value. Therefore, it is possible to preferably realize the target motion state while obtaining the desired steering reaction torque.

Incidentally, in another aspect, it may be further provided with a detecting device capable of detecting a driver's steering input, the controlling device ending the automatic steering control if the steering input is detected in a period of performing the automatic steering control.

According to this aspect, if the driver's steering input is detected in the period of performing the automatic steering control, the automatic steering control is ended. Therefore, it is possible to prevent the reduction in drivability without the automatic steering control interfering with the steering operation based on the driver's steering intention.

Incidentally, at this time, the detecting device may detect the steering input in accordance with any principles.

Moreover, in the configuration in which the detecting device is provided, the steering input may be at least one of a driver steering torque which is greater than or equal to a standard value and a driver steering angle which is greater than or equal to a standard value.

Regarding the driver steering torque and the driver steering angle, each of their large and small magnitudes can preferably indicates respective one of the driver's strong and weak steering intention. Therefore, according to this aspect, the detection accuracy of the steering input can be preferably ensured.

In another aspect of the control apparatus for the vehicle of the present invention, the target value of the steering reaction torque is less than or equal to a standard value.

According to this aspect, the steering reaction torque generated in a case where the motion state of the vehicle is the target motion state is less than or equal to the standard value; preferably, it is zero, substantially zero, or the aforementioned value corresponding to zero. Therefore, it is possible to suppress the interference between the steering reaction torque and the steering operation of the driver, to the extent that there is no problem in practice. Moreover, if the standard value is sufficiently small, the steering reaction torque is substantially canceled. This erases such a concern or worry that the steering reaction torque causes an unexpected change in the vehicle behavior in the hands-free driving, and this realizes the preferable hands-free driving.

Incidentally, the standard value may be set such that the interference with the steering operation of the driver is in the range in which the driver does not feel uncomfortable, by experiments, experiences, theories, simulations based on an ergonomic viewpoint, or the like in advance. Moreover, if the standard value is zero, the target value of the steering reaction torque is zero.

In another aspect of the control apparatus for the vehicle of the present invention, the vehicle state quantity is a yaw rate.

According to this aspect, the yaw rate is adopted as the vehicle state quantity. Since the yaw rate is an index capable of preferably indicating the turning behavior of the vehicle, it is preferable as the vehicle state quantity of the present invention.

In another aspect of the control apparatus for the vehicle of the present invention, the determining device determines the target values of the left-right braking/driving forces on the basis of a kingpin offset of the steered wheels.

The relation between the steering reaction torque transmitted to the steering apparatus via the steered wheels and the left-right braking/driving forces of the front and rear wheels is significantly influenced by the kingpin offset, which is preferably defined as a distance between the contact center point of the steered wheel and the virtual contact point of a kingpin shaft of the steered wheel. Therefore, by that the vehicle motion model that the determining device refers to is established as a model that takes into account the kingpin offset, it is possible to improve the controllability of the steering reaction torque.

In another aspect of the control apparatus for the vehicle of the present invention, it is further provided with a driver's intention specifying device for specifying a driver's intention associated with a motion state of the vehicle, the determining device adjusting the determined target values of the left-right braking/driving forces in accordance with the specified driver's intention.

According to this aspect, the driver's intention is specified by the driver's intention specifying device.

Here, the "driver's intention" means an intention that influence the motion state of the vehicle, and simply means, for example, an intention related to acceleration/deceleration. In this case, the driver's intention specifying device specifies the driver's intention with reference to an accelerator pedal pressing amount, a brake pedal pressing amount, or the like.

Since this driver's intention correlates with the motion state of the vehicle, without any consideration, the braking/driving forces of the front wheels or the rear wheels, which are one portion of the state controlled variables as control parameters for controlling the vehicle state quantity, likely interfere with the driver's intention. As a simple example, in a situation in which the driver has an intention to accelerate (decelerate), if the target values of the braking/driving forces of the front wheels or the rear wheels are the braking force (driving force), even if the vehicle state quantity and the steering reaction torque are maintained to have the target values, the driver likely feel uncomfortable.

Thus, in this aspect, the determining device adjusts the determined target values of the braking/driving forces in accordance with the specified driver's intention. Here, the term "adjust" means to select one of the braking force and the driving force, to appropriately change the distribution ratio of the braking/driving force in the range of the braking/driving force difference to be realized, and preferably to optimize it, or the like. The adjustment of the target values of the braking/driving forces as described above realizes the preferable motion state control which does not interfere with the driver's intention.

Incidentally, further to that, the determining device may adjust the target values of the braking/driving forces such that the sum of the braking/driving forces of the control target wheels (front wheels or rear wheels) is the driving force if the driver has the intention to accelerate, and such that the sum of the braking/driving forces of the control target wheels is the braking force if the driver has the intention to decelerate.

In another aspect of the control apparatus for the vehicle of the present invention, the determining device determines the target values of the left-right braking/driving forces such that a driving force is prioritized over a braking force.

According to this aspect, in the determination of the target values of the braking/driving forces, the driving force is prioritized over the braking force. In other words, if the left-right braking/driving force difference of the front wheels or the rear wheels required in the vehicle motion control is realized by the driving force, basically, it is realized by the adjustment of the driving force. Thus, it is possible to slow the progression of wearing and deterioration of a braking member accompanied by the application of the braking force to each of the wheels, which is extremely useful in quality control.

In another aspect of the control apparatus for the vehicle of the present invention, it is further provided with a road surface state specifying device for specifying a state of a road surface, the determining device adjusting the determined target values of the left-right braking/driving forces in accordance with the specified state of the road surface.

According to this aspect, the road surface state is specified by the road surface state specifying device.

Here, the "road surface state" means the state of the road surface which influences the motion state of the vehicle, and simply means the slope or inclination of the road surface, the friction coefficient of the road surface, or the like. In this case, the road surface state specifying device may obtain information about them via various road-to-vehicle communication apparatuses which constitute one portion of various transportation infrastructure systems, such as, for example, known various car navigation systems and an Intelligent Transport System (ITS), and it may use the information as a reference value in specifying the road surface state.

Since this road surface state correlates with the motion state of the vehicle, without any consideration, the braking/driving forces of the front wheels or the rear wheels, which are one portion of the state controlled variables as control parameters for controlling the vehicle state quantity, likely promote a change in the vehicle state quantity influenced by the road surface state. As a simple example, in a situation in which the road surface has an ascent (descent), if the target values of the braking/driving forces are the braking force (driving force), the deceleration (acceleration) of the vehicle is likely induced.

Thus, in this aspect, the determining device adjusts the determined target values of the braking/driving forces in accordance with the specified road surface state. Here, the term "adjust" means to select one of the braking force and the driving force, to appropriately change the distribution ratio of the braking/driving force in the range of the braking/driving force difference to be realized, and preferably to optimize it, or the like. The adjustment of the target values of the braking/driving forces as described above realizes the preferable motion state control which does not promote the change in the vehicle state quantity by the road surface state, in other words, which can suppress the change in the vehicle state quantity.

Incidentally, further to that, the determining device may adjust the target values of the braking/driving forces such that the sum of the braking/driving forces of the control target wheels (front wheels or rear wheels) is the driving force if the road surface has the ascent, and such that the sum of the braking/driving forces of the control target wheels is the braking force if the road surface has the descent. Alternatively, the determining device may adjust the target values of the braking/driving forces such that the sum of the braking/driving forces of the control target wheels is the driving force if the road surface has a high friction coefficient, and such that the sum of the braking/driving forces of the control target wheels is the braking force if the road surface has a low friction coefficient.

In another aspect of the control apparatus for the vehicle of the present invention, the braking/driving force varying device can change the left-right braking/driving force difference in each of the front wheels and the rear wheels, the control apparatus for the vehicle further comprises a μ-split braking judging device for judging whether or not the vehicle is during μ-split braking, and the determining device determines the target values of the tire steer angle of the front wheels, the tire steer angle of the rear wheels, and the braking/driving forces of the rear wheels, which correspond to the braking/driving force difference of the front wheels generated during the μ-split braking, on the basis of a μ-split braking model for defining a relation between: a tire steer angle difference of the front wheels and the rear wheels; and the left-right braking/driving force difference of the rear wheels and the left-right braking/driving force difference of the front wheels, which is set in advance such that the steering reaction torque and the vehicle state quantity are less than or equal to standard values, if it is judged that the vehicle is during the μ-split braking.

According to this aspect, it is judged by the μ-split braking judging device whether or not the μ-split braking is performed in the vehicle, wherein the μ-split braking means braking performed in the condition that the left and right wheels are in contact with road surfaces with different friction coefficients. In the μ-split braking, mainly on the front wheels, there is the left-right braking/driving force difference from the influence of the friction coefficients, and the vehicle shows an unintended turning behavior in some cases.

Here, in this aspect, in order that the vehicle state quantity (e.g. yaw rate) and the steering reaction torque in the μ-split braking are less than or equal to the standard values (regarding the steering reaction torque, for example, it may have the same value as the aforementioned standard value), the μ-split braking model is established in advance. The determining device can obtain the tire steer angle difference of the front and rear wheels and the left-right braking/driving force difference of the rear wheels according to the braking/driving force difference of the front wheels generated in the μ-split braking on the basis of the μ-split braking model, and it can ultimately determine the target values of the tire steer angles of the front and rear wheels and the target values of the braking/driving forces of the rear wheels.

Thus, according to this aspect, even if the μ-split braking takes place in the course of controlling the motion state of the vehicle for the target motion state, it is possible to suppress the steering reaction torque and the vehicle state quantity to be less than or equal to the standard values (as a preferred form, namely, both the steering reaction torque and the yaw rate may be set to zero) and to prevent the unexpected change in the vehicle behavior in the μ-split braking.

The operation and other advantages of the present invention will become more apparent from the embodiments explained below.

BRIEF DESCRIPTION OF DRAWINGS

FIG. 4 are schematic diagrams showing the states of the action of force on front wheels to which a left-right braking/driving force difference is given.

Mode for Carrying Out the Invention

Hereinafter, embodiments of the control apparatus for the vehicle of the present invention will be explained with reference to the drawings as occasion demands.
<Embodiments>
<1: First Embodiment>
<1-1: Configuration of Embodiment>

Figure 1:
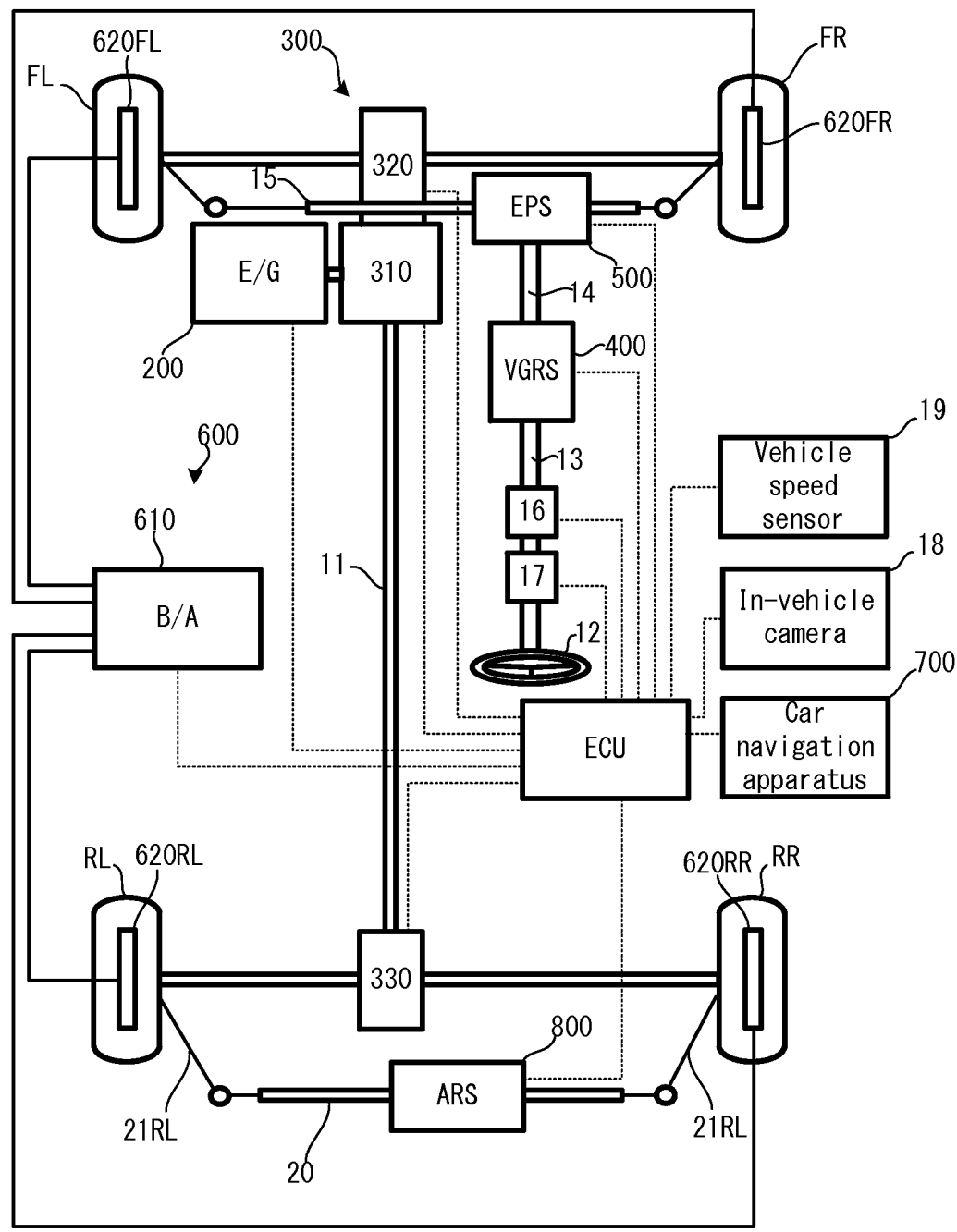
FIG. 1 is a schematic configuration diagram conceptually showing the structure of a vehicle in a first embodiment of the present invention.

Firstly, with reference to FIG. 1, the structure of a vehicle 10 in a first embodiment of the present invention will be explained. FIG. 1 is a schematic configuration diagram conceptually showing the structure of the vehicle 10.

In FIG. 1, the vehicle 10 is provided with a left front wheel FL, a right front wheel FR, a left rear wheel RL, and a right rear wheel RR, and it is configured to move in a desired direction by a change in the tire steer angle of the left front wheel FL and the right front wheel FR as steered wheels and by a change in the tire steer angle of the left rear wheel RL and the right rear wheel RR.

The vehicle 10 is provided with an ECU 100, an engine 200, a driving force distributing apparatus 300, a VGRS actuator 400, an EPS actuator 500, an Electronic Controlled Braking system (ECB) 600, a car navigation apparatus 700, and an ARS actuator 800.

The ECU 100 is provided with a central processing unit (CPU), a read only memory (ROM), and a random access memory (RAM), each of which is not illustrated, and it is an electronic control unit capable of controlling all the operations of the vehicle 10. The ECU 100 is one example of the "control apparatus for the vehicle" of the present invention. The ECU 100 is configured to perform LKA control described later, in accordance with a control program stored in the ROM.

Incidentally, the ECU 100 is a unified or one-body electronic control unit, configured to function as one example of each of the "setting device", the "determining device", the "controlling device", the "driver's intention specifying device", and the "road surface state specifying device" of the present invention. The operations of each of the devices are all performed by the ECU 100. However, the physical, mechanical and electrical configurations of each of the devices of the present invention are not limited to this, and each of the devices may be configured as various computer systems, such as a plurality of ECUs, various processing units, various controllers, or micro computer apparatuses.

The engine 200 is the power source of the vehicle 10.

Incidentally, the power source of the vehicle of the present invention is not limited to an internal combustion engine having various practical aspects (the engine 200 is also one example of them) as a concept including an engine capable of converting the combustion of fuel to mechanical power and extracting it, but it may be a rotating electrical machine such as a motor. Alternatively, the vehicle may be a so-called hybrid vehicle in which they are cooperatively controlled. A crankshaft as the driving force output shaft of the engine 200 is connected to a center differential apparatus 310 as one constituent of the driving force distributing apparatus. Incidentally, since the detailed structure of the engine 200 correlates weakly with the scope or gist of the present invention, its details are omitted here.

The driving force distributing apparatus 300 is one example of the "braking/driving force varying device" of the present invention, configured to distribute an engine torque Te transmitted via the aforementioned crankshaft from the engine 200, to the front wheels and the rear wheels at a predetermined ratio and configured to change the driving force distribution of the left and right wheels in each of the front wheels and the rear wheels. The driving force distributing apparatus 300 is provided with a center differential apparatus 310 (hereinafter referred to as a "center differential 310" as occasion demands), a front differential apparatus 320 (hereinafter referred to as a "front differential 320" as occasion demands), and a rear differential apparatus 330 (hereinafter referred to as a "rear differential 330" as occasion demands).

The center differential 310 is a limited slip differential (LSD: a differential mechanism with a differential limiting function) for distributing the engine torque Te supplied from the engine 200, to the front differential 320 and the rear differential 330. The center differential 310 distributes the engine torque Te to the front and rear wheels at a distribution ratio of (as one example but not limited to) 50:50 under the condition that a load acting on the front and rear wheels is substantially constant. Moreover, if the rotational speed of either one of the front and rear wheels is higher than that of the other, differential limit is performed such that a differential limiting torque acts on the one wheels and the torque is transferred to the other wheels. In other words, the center differential 310 is a so-called rotational-speed-sensing (viscous coupling) differential mechanism.

Incidentally, the center differential 310 is not limited to such a rotational-speed-sensing differential mechanism, but may be a torque-sensing differential mechanism in which a differential limiting action increases in proportion to an input torque. Moreover, it may be a distribution-ratio-variable differential mechanism in which a differential action is exerted by a planetary gear mechanism, in which the differential limiting torque is continuously changed by the on-off control of an electromagnetic clutch, and in which a desired distribution ratio can be realized within a predetermined adjustable range. In any case, the center differential 310 may adopt various practical aspects regardless of being publicly known or unknown, as long as it can distribute the engine torque Te to the front wheels and the rear wheels.

The front differential 320 is a distribution-ratio-variable LSD capable of distributing the engine torque Te distributed to a front axle (front wheel axle) side by the center differential 310, further to the left and right wheels at a desired distribution ratio which is set within a predetermined adjustable range. The front differential 320 is provided with: a planetary gear mechanism including a ring gear, a sun gear, and a pinion carrier; and an electromagnetic clutch for providing a differential limiting torque. To the ring gear of the planetary gear mechanism, a differential case is coupled. To the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of the physical and electrical configurations of the front differential 320.

The front differential 320 is electrically connected to the ECU 100, and the electrification control for the electromagnetic clutch is also controlled by the ECU 100. Therefore, the ECU 100 can generate a desired front wheel left-right braking/driving force difference (here, a driving force difference) $F_f$ via the drive control of the front differential 320. Incidentally, the configuration of the front differential 320 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned here to prevent a complicated explanation.

The rear differential 330 is a distribution-ratio-variable LSD capable of distributing the engine torque Te distributed to a rear axle (rear wheel axle) side via a propeller shaft 11 by the center differential 310, further to the left and right wheels at a desired distribution ratio which is set within a predetermined adjustable range. The rear differential 330 is provided with: a planetary gear mechanism including a ring gear, a sun gear, and a pinion carrier; and an electromagnetic clutch for providing a differential limiting torque. To the ring gear of the planetary gear mechanism, a differential case is coupled. To the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of the physical and electrical configurations of the rear differential 330.

The rear differential 330 is electrically connected to the ECU 100, and the electrification control for the electromagnetic clutch is also controlled by the ECU 100. Therefore, the ECU 100 can generate a desired rear wheel left-right braking/driving force difference (here, a driving force difference) $F_r$ via the drive control of the rear differential 320. Incidentally, the configuration of the rear differential 330 is not limited to what is exemplified herein, but can have various aspects regardless of being publicly known or unknown, as long as it can distribute a driving force (incidentally, the torque and the driving force have a unique or unambiguous relation) to the left and right wheels at a desired distribution ratio. In any case, such a left-right driving force distributing action is publicly known, and its details are not mentioned here to prevent a complicated explanation.

The VGRS actuator 400 is a steering transmission ratio varying apparatus provided with a housing, a VGRS motor, a reduction gear mechanism, a locking mechanism (neither of which is illustrated), and the like, and it is one example of the "tire steer angle varying device" of the present invention.

In the VGRS actuator 400, the VGRS motor, the reduction gear mechanism, and the locking mechanism are accommodated in the housing. The housing is fixed to the end on the downstream side of an upper steering shaft 13 coupled with a steering wheel 12 as the steering inputting device, and the housing and the upper steering shaft 13 can rotate substantially integrally.

The VGRS motor is a DC brushless motor having a rotor as a rotator, a stator as a stationary part, and a rotating shaft as the output shaft of a driving force. The stator is fixed to the inside of the housing, and the rotor is rotatably held within the housing. The rotating shaft is coaxially rotatably fixed to the rotor, and its end on the downstream side is coupled with the reduction gear mechanism. To the stator, a driving voltage is supplied from a not-illustrated electric drive circuit.

The reduction gear mechanism is a planetary gear mechanism having a plurality of rotational elements which can perform differential rotation (a sun gear, a carrier, and a ring gear). One of the plurality of rotational elements is coupled with the rotating shaft of the VGRS motor, and one of the other rotational elements is coupled with the aforementioned housing. Moreover, the remaining rotational element is coupled with the lower steering shaft 14.

According to the reduction gear mechanism having such a configuration, the rotational speed of the upper steering shaft 13 according to the operation amount of the steering wheel 12 (i.e. the rotational speed of the housing) and the rotational speed of the VGRS motor (i.e. the rotational speed of the rotating shaft) uniquely determine the rotational speed of the lower steering shaft 14 coupled with the remaining one rotational element. At this time, it is possible to perform increase/reduction control on the rotational speed of the lower steering shaft 14 by performing increase/reduction control on the rotational speed of the VGRS motor by means of the differential action between the rotational elements. In other words, the upper steering shaft 13 and the lower steering shaft 14 can perform relative rotation by the action of the VGRS motor and the reduction gear mechanism. Incidentally, in terms of the configuration of each rotational element in the reduction gear mechanism, the rotational speed of the VGRS motor is transmitted to the lower steering shaft 14 in the state that it is reduced in accordance with a predetermined reduction ratio which is determined in accordance with a gear ratio between the rotational elements.

As described above, in the vehicle 10, since the upper steering shaft 13 and the lower steering shaft 14 can perform the relative rotation, a steering transmission ratio is continuously variable in a predetermined set range, wherein the steering transmission ratio is a ratio between a steering angle $\delta_{MA}$ as the rotation amount of the upper steering shaft 13 and a tire steer angle $\delta_f$ of the front wheels as the steered wheels which is uniquely determined according to the rotation amount of the lower steering shaft 14 (which is also related to the gear ratio of a rack and pinion mechanism described later).

Incidentally, the locking mechanism is a clutch mechanism provided with a clutch element on the VGRS motor side and a clutch element on the housing side. In the condition that both the clutch elements engage with each other, the rotational speed of the upper steering shaft 13 matches the rotational speed of the rotating shaft of the VGRS motor. Thus, inevitably, the rotational speed of the lower steering shaft 14 also matches them. In other words, the upper steering shaft 13 and the lower steering shaft 14 are directly connected. The details of the locking mechanism are not mentioned here because it correlates weakly with the present invention.

Incidentally, the VGRS actuator 400 is electrically connected to the ECU 100, and its operations are controlled by the ECU 100.

In the vehicle 10, the rotation of the lower steering shaft 14 is transmitted to a rack and pinion mechanism. The rack and pinion mechanism is a steering transmission mechanism including a not-illustrated pinion gear connected to the end on the downstream side of the lower steering shaft 14 and a rack bar 15 in which gear teeth engaging with the gear teeth of the pinion gear are formed. The rotation of the pinion gear is converted to motion in a horizontal direction in FIG. 1 of the rack bar 15, by which a steering force is transmitted to each steered wheel via a tie rod and a knuckle (whose reference numerals are omitted) coupled with both ends of the rack bar 15. In other words, the transmission mechanism for the steering force from the steering wheel 12 to each front wheel is one example of the "steering apparatus" of the present invention.

The EPS actuator 500 is a steering torque assisting apparatus provided with an EPS motor as a DC brushless motor including: a not-illustrated rotor as a rotator to which a permanent magnet is attached; and a stator as a stationary part which surrounds the rotor.

The EPS motor can generate an EPS torque $T_{eps}$ in the direction of rotation of the rotor, which is rotated by the action of a rotating magnetic field formed in the EPS motor due to the electrification to the stator via a not-illustrated electric driving apparatus.

On the other hand, a not-illustrated reduction gear is fixed to a motor shaft as the rotating shaft of the EPS motor, and the reduction gear also directly or indirectly engages with a reduction gear disposed on the lower steering shaft 14. Thus, in the embodiment, the EPS torque $T_{eps}$ generated from the EPS motor functions as a torque for assisting the rotation of the lower steering shaft 14. Thus, if the EPS torque $T_{eps}$ is applied in the same direction as that of a driver steering torque MT applied to the upper steering shaft 13 via the steering wheel 12, a driver's steering load is reduced by the amount of the EPS torque $T_{eps}$.

Incidentally, the EPS actuator 500 is a so-called electronically-controlled power steering apparatus for assisting the driver steering torque by using the torque of a motor which is electrically controlled by the ECU 100 and whose operations are controlled by the ECU 100. The power steering apparatus provided for the vehicle 10 may be a so-called hydraulic power steering apparatus for reducing the driver's steering load due to a hydraulic driving force given via a hydraulic driving apparatus.

The vehicle 10 is provided with a steering angle sensor 16 and a steering torque sensor 17.

The steering angle sensor 16 is an angle sensor capable of detecting the steering angle $\delta_{MA}$ which indicates the rotation amount of the upper steering shaft 13. The steering angle sensor 16 is electrically connected to the ECU 100, and the detected steering angle $\delta_{MA}$ is referred to by the ECU 100 with a constant or irregular period.

The steering torque sensor 17 is a sensor capable of detecting the driver steering torque MT given via the steering wheel 12 from a driver. Explaining it more specifically, the upper steering shaft 13 has such a structure that it is divided into an upstream part and a downstream part and that the parts are mutually coupled by using a not-illustrated torsion bar. To the both ends on the upstream side and the downstream side of the torsion bar, rings for detecting a rotational phase difference are fixed. The torsion bar is twisted in its rotational direction in accordance with the steering torque (i.e. the driver steering torque MT) transmitted via the upstream part of the upper steering shaft 13 when the driver of the vehicle 10 operates the steering wheel 12, and the steering torque can be transmitted to the downstream part with the twist generated. Therefore, upon the transmission of the steering torque, there is the rotational phase difference between the rings for detecting the rotational phase difference described above. The steering torque sensor 17 can detect the rotational phase difference, convert the rotational phase difference to the steering torque, and output it as an electrical signal corresponding to the driver steering torque MT. The steering torque sensor 17 is electrically connected to the ECU 100, and the detected driver steering torque MT is referred to by the ECU 100 with a constant or irregular period.

Incidentally, the method of detecting the steering torque is not limited to this type of torsion bar method, but may adopt another method.

The ECB 600 is an electronically-controlled braking apparatus as another example of the "braking/driving force varying device" of the present invention, configured to apply a braking force individually to each of the left, right, front and rear wheels of the vehicle 10. The ECB 600 is provided with: a brake actuator 610; and braking apparatuses 620FL, 620FR, 620RL, and 620RR corresponding to the left front wheel FL, the right front wheel FR, the left rear wheel RL and the right rear wheel RR, respectively.

The brake actuator 610 is a hydraulic control actuator configured to supply hydraulic oil individually to each of the braking apparatuses 620FL, 620FR, 620RL, and 620RR. The brake actuator 610 is provided with a master cylinder, an electric oil pump, a plurality of hydraulic transmission paths, an electromagnetic valve disposed in each of the hydraulic transmission paths, and the like, and it can control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-on-one relation with the pressing force of a braking pad provided for each braking apparatus, and the high and low hydraulic pressures of the hydraulic oil correspond to the large and small braking forces of each braking apparatus, respectively.

The brake actuator 610 is electrically connected to the ECU 100, and the braking force applied to each wheel from each braking apparatus is controlled by the ECU 100.

The vehicle 10 is provided with an in-vehicle camera 18 and a vehicle speed sensor 19.

The in-vehicle camera 18 is an imaging apparatus which is disposed on the front nose of the vehicle 10 or the like and which can image a predetermined area ahead of the vehicle 10. The in-vehicle camera 18 is electrically connected to the ECU 100, and the imaged area ahead is sent out to the ECU 100 as image data with a constant or irregular period. The ECU 100 can analyze the image data and obtain various data necessary for LKA control described later.

The vehicle speed sensor 19 is a sensor capable of detecting a vehicle speed V as the speed or velocity of the vehicle 10. The vehicle speed sensor 19 is electrically connected to the ECU 100, and the detected vehicle speed V is referred to by the ECU 100 with a constant or irregular period.

The car navigation apparatus 700 is an apparatus capable of providing various navigation information including information about the position of the vehicle 10, information about roads around the vehicle 10 (a road type, a road width, the number of lanes, a speed limit, a road shape, etc.), information about traffic lights, information about various facilities placed around the vehicle 10, information about traffic jams, environmental information, and the like, on the basis of signals obtained via a VICS antenna and a GPS antenna disposed in the vehicle 10. The car navigation apparatus 700 is electrically connected to the ECU 100, and its operation state is controlled by the ECU 100.

The ARS actuator 800 is a rear wheel steering actuator as another example of the "tire steer angle varying device" of the present invention, capable of changing a rear wheel tire steer angle $\delta_r$, which is the tire steer angle of the left rear wheel RL and the right rear wheel RR, independently of a steering input given by the driver via the steering wheel 12.

The ARS actuator 800 contains an ARS motor and a reduction gear mechanism, and the drive circuit of the ARS motor is electrically connected to the ECU 100. Therefore, the ECU 100 can control an ARS torque $T_{ars}$, which is the output torque of the ARS motor, by controlling the drive circuit.

On the other hand, the reduction gear can transmit the torque of the ARS motor to a rear steering rod 20 with deceleration.

The rear steering rod 20 is coupled with the left rear wheels RL and the right rear wheel RR via joint members 21RL and 21RR, respectively. If the rear steering rod 20 is driven by the ARS torque $T_{ars}$ in a horizontal one direction illustrated, each of the rear wheels is steered in one direction.

Incidentally, the ARS actuator 800 may be provided with a direct acting mechanism capable of converting a rotary motion to a stroke motion. If this type of direct acting mechanism is provided, the rear steering rod 20 may change the tire steer angle of the rear wheels in accordance with the stroke motion in the horizontal direction of this direct acting mechanism.

Incidentally, the practical aspect of the rear wheel steering apparatus is not limited to that of the ARS actuator 800 illustrated as long as it can make the rear wheel tire steer angle $\delta_r$ variable in a predetermined range.

Incidentally, the vehicle 10 in the embodiment can control the tire steer angles of the front and rear wheels independently of the steering input from the driver side by virtue of the VGRS actuator 400 and the ARS actuator 800. However, such a vehicle configuration is merely one configuration example which can be adopted by the vehicle of the present invention and which is shown as a matter of convenience to make it easy to explain the variations of a vehicle motion model for realizing the control of a yaw rate γ and a steering reaction torque T described later. For example, the vehicle of the present invention may, in terms of the vehicle 10, have a vehicle configuration in which there is no VGRS actuator 400, i.e. in which only the rear wheel tire steer angle can be active-controlled, or a vehicle configuration in which there is no ARS actuator 800, i.e. in which only the front wheel tire steer angle can be active-controlled. Furthermore, the configuration in which only the tire steer angle of either one of the front and rear wheels can be active-controlled is overwhelmingly advantageous in terms of cost, vehicle weight, and installation space, and preferably, the vehicle has one of them installed in a practical aspect. If the tire steer angle of either one of the front and rear wheels can be active-controlled, the yaw rate γ and the steering reaction torque T described later can be performed without any problems in practice.

<1-2: Operations of Embodiment>
<1-2-1: Details of LKA Control>

Figure 2:
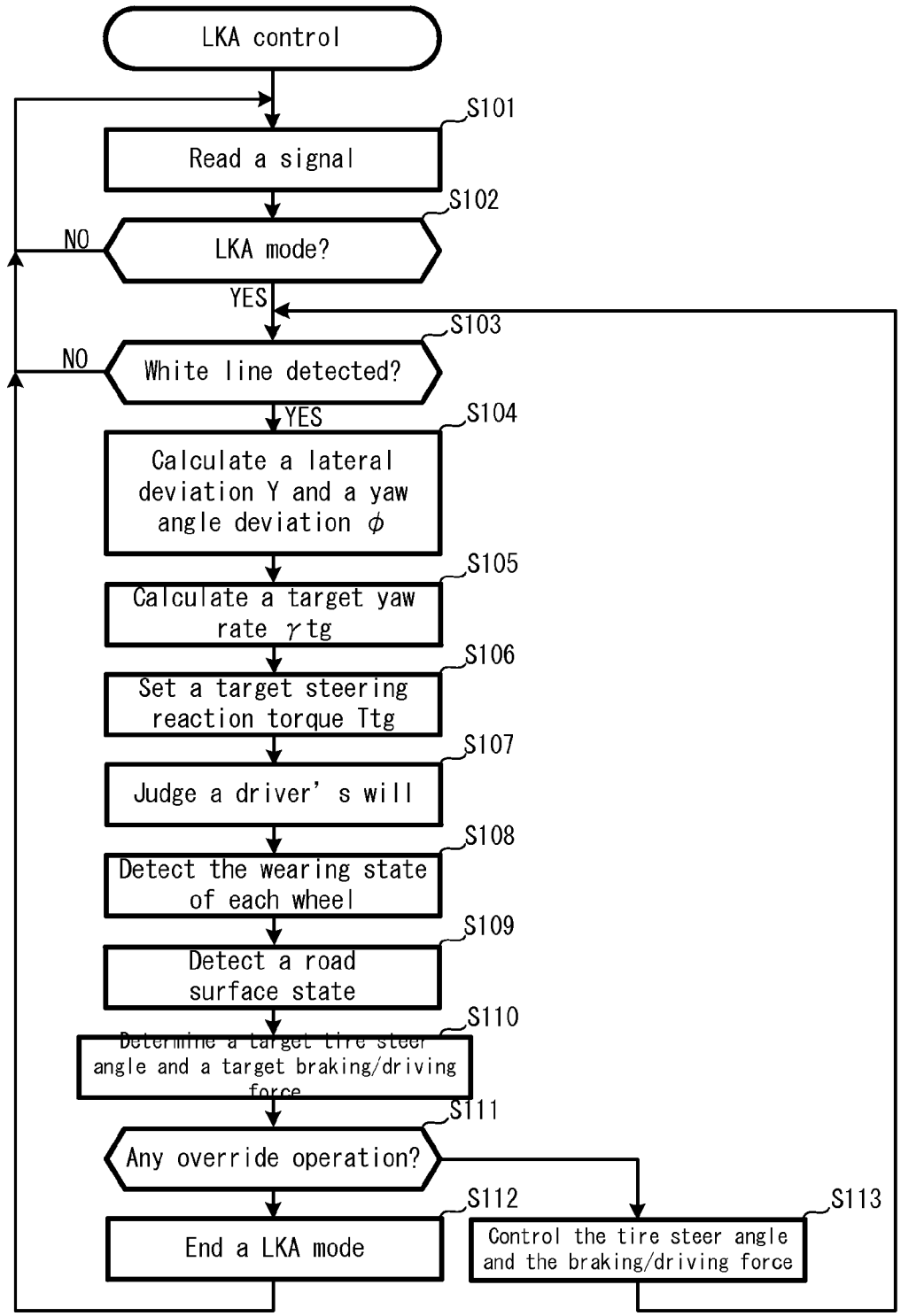
FIG. 2 is a flowchart showing LKA control performed in the vehicle in FIG. 1.

Hereinafter, with reference to FIG. 2, as the operations of the embodiment, an explanation will be given on the details of LKA control performed by the ECU 100. FIG. 2 is a flowchart showing the LKA control. Incidentally, the LKA (Lane Keeping Assist) control is control for making the vehicle 10 follows a target driving route (i.e. a lane in the embodiment), and it is one driving support control performed on the vehicle 10. Moreover, the following to the target driving route is namely one example of the "target motional state of the vehicle" in the present invention.

In FIG. 2, the ECU 100 reads various signals including operations signals of various switches etc. provided for the vehicle 10, various flags, sensor signals associated with the aforementioned various sensors, and the like (step S101) and judges whether or not a LKA mode is selected as a result of such an operation that an operation button, disposed in the interior of the vehicle 10 in advance, for exercising the LKA mode is operated by the driver or similar actions (step S102). If the LKA mode is not selected (the step S102: NO), the ECU 100 returns the process to the step S101.

If the LKA mode is selected (the step S102: YES), the ECU 100 judges whether or not a white line (not necessarily white) for defining the target driving route of the LKA is detected on the basis of the image data sent out from the in-vehicle camera 18 (step S103).

If the white line is not detected (the step S103: NO), a virtual target driving route cannot be set, and thus, the ECU 100 returns the process to the step S101. On the other hand, if the white line is detected (the step S103: YES), the ECU 100 calculates various road surface information required when the vehicle 10 is made to follow the target driving route (step S104).

In the step S104, a lateral deviation Y, which is a deviation in the lateral direction of the white line and the vehicle 10, and a yaw angle deviation $\phi$ between the white line and the vehicle 10 are calculated on the basis of a known method.

If the various road surface information is calculated, the ECU 100 calculates a target yaw rate $\gamma_{tg}$ as the target value of a vehicle state quantity required to make the vehicle 10 follow the target driving route (step S105). The step S105 is one example of the operations of the "setting device" of the present invention (particularly, corresponding to claim 6 in this application indicating that a yaw rate is used as the state quantity). The target yaw rate $\gamma_{tg}$ is mapped in a form corresponding to the a lateral deviation Y and the yaw angle deviation $\phi$ described above and is stored in a proper memory device such as a ROM in advance. The ECU 100 selects a relevant value as occasion demands in accordance with the various road surface information calculated in the step S104, thereby setting the target yaw rate $\gamma_{tg}$. Regarding the aspect of setting the target yaw rate $\gamma_{tg}$, various aspects can be applied regardless of being publicly known or unknown.

If the target yaw rate $\gamma_{tg}$ is set, the ECU 100 sets a target steering reaction torque $T_{tg}$ (step S106). The target steering reaction torque $T_{tg}$ is a torque acting on the steering apparatus from the front wheels as the steered wheels in making the vehicle 10 follow the target driving route, and it is one example of the "steering reaction torque" of the present invention. Incidentally, in the embodiment, the target steering reaction torque $T_{tg}$ is zero in the embodiment (i.e. corresponding to claim 5 in this application indicating that the target steering reaction torque is less than or equal to a standard value). The fact that the target steering reaction torque $T_{tg}$ is zero means that it is not necessary to give a steering retention torque to the steering wheel 12 when the vehicle 10 follows the target driving route and that hands-free driving is possible.

Then, the ECU 100 judges a driver's intention (step S107).

Here, the "driver's intention" in the embodiment means a driver's intention about the acceleration and deceleration of the vehicle. The ECU 100 refers to the sensor outputs of an accelerator opening sensor and a brake pedal sensor, which are not illustrated in FIG. 1, and judges whether or not each of their values is greater than or equal to respective one of set standard values.

If an accelerator opening degree Ta detected by the accelerator opening sensor is greater than or equal to the standard value, the ECU 100 judges that the driver has an intention to accelerate. If a brake pedal pressing amount $T_b$ detected by the brake pedal sensor is greater than or equal to the standard value, the ECU 100 judges that the driver has an intention to decelerate. Moreover, if any of them is less than the standard value, the ECU 100 judges that the driver has neither the intention to accelerate nor the intention to decelerate.

The judgment result of the driver's intention is temporarily stored in a volatile memory such as a RAM. Incidentally, the step S107 is one example of the operations of the "driver's intention specifying device" of the present invention.

Then, the ECU 100 detects the wearing state of each of the front and rear wheels (step S108).

Here, the "wearing state of each of the front and rear wheels" in the embodiment means the wearing state of the brake pad of each of the braking apparatuses corresponding to respective one of the wheels. Regarding the wearing state of the brake pad, for example, if each wheel is provided with a sensor capable of detecting the degree of the wearing state, then, it may be recognized with reference to the sensor output of each sensor. Alternatively, an integration value of the braking force applied to each wheel may be stored as a past driving history, and the wearing state may be estimated on the basis of the stored integration value of the braking force. The detection result of the wearing state is temporarily stored in the volatile memory such as a RAM.

Moreover, the ECU 100 detects the road surface state of the driving route of the vehicle 10 (step S109).

Here, the "road surface state of the driving route" in the embodiment means the slope or inclination of the driving route. The slope of the driving route can be obtained via the car navigation apparatus 700. Incidentally, the slope of the driving route can be preferably gauged by providing a detecting device such as a slope sensor. The detection result of the road surface state is temporarily stored in the volatile memory such as a RAM.

In the step S105 to the step S109, if the elements required for the calculation of a target tire steer angle and a target braking/driving force are obtained, the ECU 100 determines the target tire steer angle and the target braking/driving force to be the tire steer angle and the braking/driving force required for the following to the target driving route, respectively (step S110). Incidentally, the step S110 is one example of the operations of the "determining device" of the present invention.

Incidentally, the detailed method of determining the target tire steer angle and the target braking/driving force will be described later, but the ECU 100 determines the target value of the tire steer angle of either one of the front and rear wheels and the target values of the braking/driving forces of either one of the front and rear wheels, for setting the yaw rate $\gamma$ and the steering reaction torque T to be the target yaw rate $\gamma_{tg}$ and the target steering reaction torque $T_{tg}$, respectively, on the basis of the vehicle motion model set in order to define a relative relation between: the yaw rate $\gamma$ and the steering reaction torque T; and the tire steer angle of either one of the front and rear wheels and the left-right braking/driving force difference of either one of the front and rear wheels. In other words, one of the front wheel tire steer angle $\delta_f$ and the rear wheel tire steer angle $\delta_r$ and one of the front wheel left-right braking/driving force difference $F_f$ and the rear wheel left-right braking/driving force difference $F_r$ are one example of the "state controlled variables" of the present invention.

If the target tire steer angle and the target braking/driving force are obtained, the ECU 100 judges whether or not there is an overriding operation by the driver (step S111). The overriding operation is a steering operation performed by the driver on his own intention, i.e. one of the steering inputs to be prioritized most in terms of vehicle driving control. The ECU 100 refers to the sensor outputs of the steering angle sensor 16 and the steering torque sensor 17 when judging whether or not there is the overriding operation, and judges that the overriding operation takes place if the steering angle $\delta_{MA}$ is greater than or equal to a standard value $\delta_{MAth}$ or if the driver steering torque MT is greater than or equal to a standard value $MT_{th}$.

Incidentally, the operation in the step S111 is one example of the operations of the "detecting device" of the present invention.

If it is judged that the overriding operation takes place (the step S111: YES), the ECU 100 ends the LKA mode (step S112). If the LKA mode is ended, the process is returned to the step S101, and a series of the process operations is repeated. Incidentally, the operation in the step S112 corresponds to claim 3 in this application indicating that "the automatic steering control is ended if the steering input is detected."

On the other hand, if the overriding operation does not take place (the step S111: NO), the ECU 100 controls at least one of the VGRS actuator 400 or the ARS actuator 800 and the driving force distributing apparatus 300 and the ECB 600 so as to obtain the target tire steer angle and the target braking/driving force calculated in the step S110. Incidentally, whether the target braking/driving force is realized by the driving force distributing apparatus 300 or by the ECB 600 or by both of them varies depending on the result of each judgment or detection in the steps S107, S108, and S109 (corresponding to claim 8 and claim 10 in this application).

If the braking/driving force is controlled, the process is returned to the step S103, and a series of the process operations in the LKA mode is repeated. The LKA control is performed as described above.

<1-2-2: Generation of Yaw Moment due to Left-Right Braking/Driving Force Difference>

Figure 3:
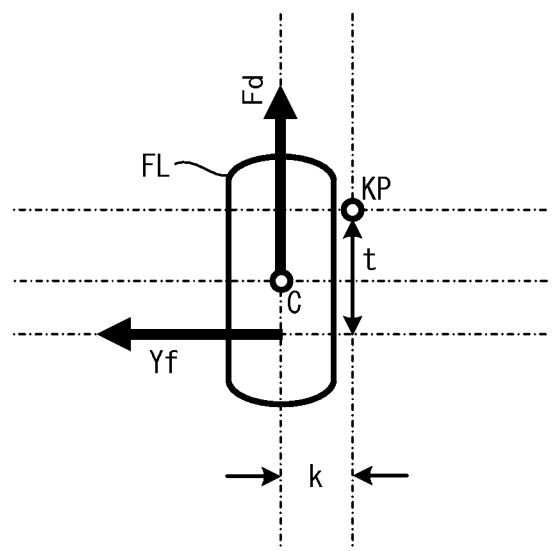
FIG. 3 is a top view showing a left front wheel in a case where a driving force acts.

Now, with reference to FIG. 3, a relation between the braking/driving force acting on the wheel and yaw moment will be explained. FIG. 3 is a top view showing the left front wheel FL in a case where a driving force acts. Incidentally, in FIG. 3, portions overlapping those of FIG. 1 will carry the same reference numerals, and the explanation thereof will be omitted as occasion demands.

In FIG. 3, a driving force $F_d$ acts on a contact point C of the left front wheel FL. On the other hand, if a virtual contact point KP of a kingpin axis (which is a virtual steering axis connecting an upper pole joint and a lower pole joint) deviates from an axis passing through the contact point C as illustrated (the same shall apply to most vehicles), yaw moment is generated on the left front wheel FL depending on a kingpin offset k which is a distance between the axle and the virtual contact point KP. Here, as is clear from the positional relation illustrated, the generation direction of the yaw moment in this case is a right turning direction.

Here, if there is no driving force difference between the left and right wheels, yaw moment in a left turning direction having the same magnitude as that of the yaw moment generated on the left front wheel FL is generated on the right front wheel FR. Therefore, if there is no driving force difference, the vehicle motion is a straight-ahead motion.

However, if there is a driving force difference between the left and right wheels, the yaw moment generated on the wheels on the side having a larger driving force becomes larger. Thus, in the vehicle 10, the yaw moment for turning to the side of the wheel having a smaller driving force is generated. Therefore, if the driving force of the left front wheel is set to be greater than that of the right front wheel, the yaw moment in the right turning direction is generated, and if the driving force of the right front wheel is set to be greater than that of the left front wheel, the yaw moment in the left turning direction is generated.

Incidentally, if the driving force acts on the left front wheel FL, a tire lateral force Yf is generated in the left direction at a point of application of force on the rear side of the tire contact point in the left front wheel FL. A distance t between this point of application of force and the virtual contact point KP means the sum of a caster trail, which is an axial direction distance between the virtual contact point KP and the tire contact point C, and a pneumatic trail, which is a distance between the tire contact point C and the lateral force Yf.

The yaw moment as described above can be generated in the same manner even if a braking force acts instead of the driving force. The braking force is a negative driving force, and if there is a braking force difference between the left and right wheels, the yaw moment is generated to the side of the wheel having a larger braking force. In any case, by providing the braking/driving force difference for the left and right wheels, it is possible to provide a turning behavior for the vehicle 10. In the step S110 in the LKA control, the values of the state controlled variables for setting the yaw rate $\gamma$ and the steering reaction torque T to be the target yaw rate $\gamma_{tg}$ and the target steering reaction torque $T_{tg}$, respectively, are obtained by the vehicle motion model in which the front wheel tire steer angle $\delta_f$ or the rear wheel tire steer angle $\delta_r$ and the front wheel braking/driving force difference $F_f$ or the rear wheel braking/driving force difference $F_r$ are the state controlled variables and which is established on the basis of a known equation of vehicle motion including such a principle. In the end, the tire steer angle (incidentally, regarding the tire steer angle, since the tire steer angle itself is the state controlled variable, a value calculated from the motion model is the target tire steer angle) and the braking/driving force are calculated.

Now, with reference to FIG. 4, a relation between the braking/driving forces of the left and right wheels and the acceleration/deceleration state of the vehicle 10 will be explained. FIG. 4 are schematic diagrams showing the states of the action of force on the front wheels to which the left-right braking/driving force difference is given. Incidentally, in FIG. 4, portions overlapping those of FIG. 1 will carry the same reference numerals, and the explanation thereof will be omitted as occasion demands.

In FIG. 4, FIG. 4(a) shows a case where the vehicle 10 is in a steady driving state (i.e. a state in which a front/rear force $F_{fx}$ ($F_{fx}=F_{fl}+F_{fr}$) acting on the front wheels is zero), FIG. 4(b) shows a case where the vehicle 10 is in an acceleration state (i.e. a state in which $F_{fx}>0$), and FIG. 4(c) shows a case where the vehicle 10 is in a deceleration state (i.e. a state in which $F_{fx}<0$).

In FIG. 4(a), it is assumed that the front wheel left-right braking/driving force difference for realizing a desired vehicle behavior is $F_{f0}$. In this case, if a left front wheel braking/driving force $F_{fl}$ is set to be $F_{fl}=F_{f0}/2$ and a right front wheel braking/driving force $F_{fr}$ is set to be $F_{fr}=-F_{f0}/2$, the front/rear force $F_{fx}$ acting on the front wheels is zero. Therefore, it is possible to maintain the steady driving state while applying a desired front wheel braking/driving force difference.

In FIG. 4(b), it is assumed that a driving force $F_{fl0}$ acts on the left front wheel FL, that a driving force $F_{fr0}$ acts on the right front wheel FR, and that the front wheel left-right braking/driving force difference for realizing a desired vehicle behavior is $F_{f0}$.

In this case, if the left front wheel braking/driving force $F_{fl}$ is set to be $F_{fl}=F_{fl0}+F_{f0}/2$ and the right front wheel braking/driving force $F_{fr}$ is set to be $F_{fr}=F_{fr0}-F_{f0}/2$, the front/rear force $F_{fx}$ acting on the front wheels is $F_{fl0}+F_{fr0}$. Therefore, it is possible to maintain the acceleration state while applying a desired front wheel braking/driving force difference.

In FIG. 4(c), it is assumed that a braking force $-F_{f\!l0}$ acts on the left front wheel FL, that a braking force $-F_{fr0}$ acts on the right front wheel FR, and that the front wheel left-right braking/driving force difference for realizing a desired vehicle behavior is $F_{f0}$.

In this case, if the left front wheel braking/driving force $F_{f\!l}$ is set to be $F_{f\!l}=-F_{f\!l0}+F_{f0}/2$ and the right front wheel braking/driving force $F_{fr}$ is set to be $F_{fr}=-F_{fr0}-F_0/2$, the front/rear force $F_{fx}$ acting on the front wheels is $-(F_{f\!l0}+F_{fr0})$. Therefore, it is possible to maintain the deceleration state while applying a desired front wheel braking/driving force difference.

<1-2-3: Method of Determining Target Tire steer Angle and Target Braking/Driving Force Based on Vehicle Motion Model>

Next, an explanation will be given on the operation in the step S110 in the LKA control, i.e. the determination of the target tire steer angle and the target braking/driving force based on the vehicle motion model.

Incidentally, in the embodiment, there can be four patterns of vehicle motion models, which are the following pattern A to pattern D, depending on whether to use the front wheel tire steer angle $\delta_f$ or the rear wheel tire steer angle $\delta_r$ as the tire steer angle, or whether to use the front wheel braking/driving force difference $F_f$ or the rear wheel braking/driving force difference $F_r$ as the braking/driving force difference.

<Pattern A: Case where Front Wheel Tire Steer Angle $\delta_f$ and Front Wheel Braking/Driving Force Difference $F_f$ are State Controlled Variables>

Firstly, an explanation will be given on a pattern A in which the front wheel tire steer angle $\delta_f$ and the front wheel left-right braking/driving force difference $F_f$ are used as the state controlled variables which are controllable parameters in the vehicle motion model.

The vehicle motion model in the pattern A is ultimately expressed as an equation (4) by solving equations of vehicle motion expressed as the following equations (1) to (3) for the yaw rate γ and the steering reaction torque T. Incidentally, the meaning of each reference numeral in the following equations is added in advance.

s . . . Laplace operator
$\delta_f$ . . . front wheel steering angle
$\delta_r$ . . . rear wheel steering angle
β . . . vehicle body slip angle
γ . . . yaw rate
T . . . steering reaction torque (torque around the kingpin axis in the embodiment)
$S_t$ . . . stability factor (described later)
$M_f$ . . . front axle mass
$M_r$ . . . rear axle mass
M . . . vehicle mass ($M=M_f+M_r$)
I . . . yawing moment of inertia
L . . . wheel base
$L_f$ . . . front-back direction distance from the center of gravity of the vehicle to the front axle
$L_r$ . . . front-back direction distance from the center of gravity of the vehicle to the rear axle
$K_f$ . . . front wheel cornering power
$K_r$ . . . rear wheel cornering power
$T_f$ . . . front axle tread
$T_r$ . . . rear axle tread
t . . . front-back direction trail amount
k . . . kingpin offset
$Y_f$ . . . front wheel lateral force
$Y_r$ . . . rear wheel lateral force
$F_{f\!l}$ . . . left front wheel driving force
$F_{fr}$ . . . right front wheel driving force
$F_{rl}$ . . . left rear wheel driving force
$F_{rr}$ . . . right rear wheel driving force
$F_f$ . . . front wheel left-right braking/driving force difference
$F_r$ . . . rear wheel left-right braking/driving force difference

[Equation 1]
$$MV\left(\frac{d\beta}{dt}+\gamma\right) = (2Y_f + Y_r) \quad (1)$$

[Equation 2]
$$I\frac{d\gamma}{dt} = (2L_f Y_f - L_r Y_r) - T_f \frac{F_f}{2} \quad (2)$$

[Equation 3]
$$T = 2tY_f - kF_f \quad (3)$$

[Equation 4]
$$\begin{bmatrix} \delta_f \\ F_f \end{bmatrix} = A^{-1} \begin{bmatrix} \gamma \\ T \end{bmatrix} \quad (4)$$

Here, $A^{-1}$ is the inverse matrix of a matrix A, and the matrix A is expressed as the following equation (5).

[Equation 5]
$$A = \frac{1}{1+S_t V^2} \begin{bmatrix} A11 & A12 \\ A21 & A22 \end{bmatrix} \quad (5)$$

In the equation (5), $S_t$ is a stability factor, and it is defined by the following equation (6).

[Equation 6]
$$S_t = \frac{-M(L_f K_f - L_r K_r)}{2L^2 K_f K_r} \quad (6)$$

Moreover, in the equation (5), A11, A12, A21, and A22 are matrix coefficients, and they are expressed as the following equations (7) to (10), respectively.

[Equation 7]
$$A11 = \frac{V}{L} \quad (7)$$

[Equation 8]
$$A12 = \frac{-VT_f(K_f + K_r)}{4L^2 K_f K_r} \quad (8)$$

[Equation 9]
$$A21 = \frac{MV^2 t L_r}{L^2} \quad (9)$$

[Equation 10]
$$A22 = \frac{-tT_f(MV^2 - 2LK_r)}{4L^2 Kr} + k(1+S_t V^2) \quad (10)$$

The equation (4) indicates that it is possible to perform motion control with two degrees of freedom in which the yaw rate γ and the steering reaction torque T are independently controlled by the front wheel tire steer angle $\delta_f$ and the front wheel braking/driving force difference $F_f$ as the state controlled variables, respectively.

In other words, the ECU 100 calculates the front wheel tire steer angle $\delta_f$ and the front wheel left-right braking/driving force difference $F_f$ for obtaining the target yaw rate $\gamma_{tg}$ and the target steering reaction torque $T_{tg}$ with reference to the vehicle motion model represented by the equation (4) in the step S110 in the LKA control. The obtained front wheel tire steer angle $\delta_f$ is used for the tire steer angle control using the VGRS actuator 400 in the step S113, as a target front wheel tire steer angle $\delta_{ftg}$ which is the target value of the front wheel tire steer angle without change.

On the other hand, the left front wheel braking/driving force $F_{fl}$ and the right front wheel braking/driving force $F_{fr}$ are determined so as to satisfy the obtained front wheel braking/driving force difference $F_f$. Here, the left front wheel braking/driving force $F_{fl}$ and the right front wheel braking/driving force $F_{fr}$ which satisfy the obtained front wheel braking/driving force difference $F_f$ are not unique or not unambiguous; however, as long as they satisfy the front wheel braking/driving force difference $F_f$, it is possible to realize the desired yaw rate γ ($\gamma = \gamma_{tg}$) while suppressing the steering reaction torque T to be the target steering reaction torque $T_{tg}$ ($T_{tg}=0$).

However, in the embodiment, a certain rule is provided when the braking/driving force is finally derived from the braking/driving force difference obtained on the basis of the vehicle motion model, including each pattern described later. This rule will be described later.

Here, the equation (4) is the vehicle motion model in which the frequency response of the vehicle 10 is not considered and assumes a case where the behavior of the vehicle 10 steadily or constantly changes. Therefore, for a transitional motion or the like in which the degree of the acceleration/deceleration is large, the accuracies of the obtained front wheel tire steer angle $\delta_f$ and the obtained front wheel braking/driving force difference $F_f$ are reduced.

In view of such a case, in the embodiment, a vehicle motion model for transitional response including a time constant element considering the frequency response is prepared in advance. In the vehicle motion model for transitional response, the matrix A in the equation (4) is expressed as the following equation (11)

[Equation 11]

$$A = \frac{1}{det(x)}\begin{bmatrix} B11 & B12 \\ B21 & B22 \end{bmatrix} \quad (11)$$

Here, det(x) is expressed as the following equation (12).
[Equation 12]

$$det(x) = X1 + X2 + X3 \quad (12)$$

In the equation (12), the first term in the right side X1, the second term in the right side X2, and the third term in the right side X3 are expressed as the following equations (13) to (15).
[Equation 13]

$$X1 = MIV_s^2 \quad (13)$$

[Equation 14]

$$X2 = 2\{I(K_f + K_r) + M(L_f^2 K_f + L_r^2 K_r)\}s \quad (14)$$

[Equation 15]

$$X3 = \frac{4}{V}L^2 K_f K_r - 2MV(L_f K_f - L_r K_r) \quad (15)$$

Moreover, matrix coefficients B11, B12, B21, and B22 in the equation (11) are expressed as the following equations (16) to (19), respectively.

[Equation 16]

$$B11 = \frac{4L^2 K_f K_r}{V}\frac{V}{L} + 2MVL_f K_f s \quad (16)$$

[Equation 17]

$$B12 = -T_f(K_f + K_r) - \frac{MVT_f}{2}s \quad (17)$$

[Equation 18]

$$B21 = 4MVtL_r K_f K_r + 4tK_f K_r(ML_r^2 + I)s + 2MIVtK_f s^2 \quad (18)$$

[Equation 19]

$$B22 = -T_f\left(MVtK_f - \frac{2tLK_f K_r}{V}\right) + MtT_f L_f K_f s + kdet(x) \quad (19)$$

As described above, according to the vehicle motion model for transitional response, the matrix for defining the relative relation between: the vehicle state quantity (γ) and the steering reaction torque T; and the state controlled variables includes a frequency response term (time constant term) including the Laplace operator, as occasion demands. Thus, even for the vehicle motion in a transitional area in which a change in the vehicle speed cannot be ignored, it is possible to perform the preferable vehicle motion control with two degrees of freedom in which the vehicle state quantity and the steering reaction torque T are maintained to have desired values.

<Pattern B: Case where Front Wheel Tire Steer Angle $\delta_f$ and Rear Wheel Braking/Driving Force Difference $F_r$ are State Controlled Variables>

The vehicle motion model in the pattern B is ultimately expressed as an equation (22) by solving equations of vehicle motion expressed as the aforementioned equation (1) and the following equations (20) and (21) for the yaw rate γ and the steering reaction torque T.

[Equation 20]

$$I\frac{d\gamma}{dt} = (2L_f Y_f - L_r Y_r) - T_r \frac{F_r}{2} \quad (20)$$

[Equation 21]

$$T = 2tY_f \quad (21)$$

[Equation 22]

$$\begin{bmatrix} \delta_f \\ F_r \end{bmatrix} = C^{-1}\begin{bmatrix} \gamma \\ T \end{bmatrix} \quad (22)$$

Here, $C^{-1}$ is the inverse matrix of a matrix C, and the matrix C is expressed as the following equation (23).

[Equation 23]

$$C = \frac{1}{1+S_t V^2}\begin{bmatrix} C11 & C12 \\ C21 & C22 \end{bmatrix} \quad (23)$$

Moreover, in the equation (23), C11, C12, C21, and C22 are matrix coefficients, and they are expressed as the following equations (24) to (27), respectively.

[Equation 24]

$$C11 = \frac{V}{L} \quad (24)$$

[Equation 25]

$$C12 = \frac{-VT_r(K_f + K_r)}{4L^2 K_f K_r} \quad (25)$$

[Equation 26]

$$C21 = \frac{MV^2 t L_r}{L^2} \quad (26)$$

[Equation 27]

$$C22 = \frac{-tT_r(MV^2 - 2LK_r)}{4L^2 Kr} \quad (27)$$

The equation (22) indicates that it is possible to perform motion control with two degrees of freedom in which the yaw rate γ and the steering reaction torque T are independently controlled by the front wheel tire steer angle $\delta_f$ and the rear wheel braking/driving force difference $F_r$ as the state controlled variables, respectively.

In other words, the ECU 100 calculates the front wheel tire steer angle $\delta_f$ and the rear wheel left-right braking/driving force difference $F_r$ for obtaining the target yaw rate $\gamma_{tg}$ and the target steering reaction torque $T_{tg}$ with reference to the vehicle motion model represented by the equation (22) in the step S110 in the LKA control. The obtained front wheel tire steer angle $\delta_f$ is used for the tire steer angle control using the VGRS actuator 400 in the step S113, as the target front wheel tire steer angle $\delta_{ftg}$ which is the target value of the front wheel tire steer angle without change.

On the other hand, the left rear wheel braking/driving force $F_{rl}$ and the right rear wheel braking/driving force $F_{rr}$ are determined so as to satisfy the obtained rear wheel braking/driving force $F_r$. Here, the left rear wheel braking/driving force $F_{rl}$ and the right rear wheel braking/driving force $F_{rr}$ which satisfy the obtained rear wheel braking/driving force $F_r$ are not unique or not unambiguous; however, as long as they satisfy the rear wheel braking/driving force difference $F_r$, it is possible to realize the desired yaw rate γ ($\gamma=\gamma_{tg}$) while suppressing the steering reaction torque T to be the target steering reaction torque $T_{tg}$ ($T_{tg}=0$).

<Pattern C: Case where Rear Wheel Tire Steer Angle $\delta_r$ and Front Wheel Braking/Driving Force Difference $F_f$ are State Controlled Variables>

The vehicle motion model in the pattern C is ultimately expressed as an equation (29) by solving equations of vehicle motion expressed as the aforementioned equations (1) and (3) and the following equation (28) for the yaw rate γ and the steering reaction torque T.

[Equation 28]

$$I\frac{d\gamma}{dt} = (2L_f Y_f - L_r Y_r) - T_f \frac{F_f}{2} \quad (28)$$

[Equation 29]

$$\begin{bmatrix} \delta_r \\ F_f \end{bmatrix} = D^{-1} \begin{bmatrix} \gamma \\ T \end{bmatrix} \quad (29)$$

Here, $D^{-1}$ is the inverse matrix of a matrix D, and the matrix D is expressed as the following equation (30).

[Equation 30]

$$D = \frac{1}{1+S_t V^2}\begin{bmatrix} D11 & D12 \\ D21 & D22 \end{bmatrix} \quad (30)$$

Moreover, in the equation (29), D11, D12, D21, and D22 are matrix coefficients, and they are expressed as the following equations (31) to (34), respectively.

[Equation 31]

$$D11 = -\frac{V}{L} \quad (31)$$

[Equation 32]

$$D12 = \frac{-VT_f(K_f + K_r)}{4L^2 K_f K_r} \quad (32)$$

[Equation 33]

$$D21 = \frac{-MV^2 t L_r}{L^2} \quad (33)$$

[Equation 34]

$$D22 = \frac{-tT_f(MV^2 - 2LK_r)}{4L^2 Kr} + k(1+S_t V^2) \quad (34)$$

The equation (29) indicates that it is possible to perform motion control with two degrees of freedom in which the yaw rate γ and the steering reaction torque T are independently controlled by the rear wheel tire steer angle $\delta_r$ and the front wheel braking/driving force difference $F_f$ as the state controlled variables, respectively.

In other words, the ECU 100 calculates the rear wheel tire steer angle $\delta_r$ and the front wheel left-right braking/driving force difference $F_f$ for obtaining the target yaw rate $\gamma_{tg}$ and the target steering reaction torque $T_{tg}$ with reference to the vehicle motion model represented by the equation (29) in the step S110 in the LKA control. The obtained rear wheel tire steer angle $\delta_r$ is used for the tire steer angle control using the ARS actuator 800 in the step S113, as a target rear wheel tire steer angle $\delta_{rtg}$ which is the target value of the rear wheel tire steer angle without change.

On the other hand, the left front wheel braking/driving force $F_{fl}$ and the right front wheel braking/driving force $F_{fr}$ are determined so as to satisfy the obtained front wheel braking/driving force $F_f$. Here, the left front wheel braking/driving force $F_{fl}$ and the right front wheel braking/driving force $F_{fr}$ which satisfy the obtained front wheel braking/driving force $F_f$ are not unique or not unambiguous; however, as long as they satisfy the front wheel braking/driving force difference $F_f$, it is possible to realize the desired yaw rate γ (γ=$γ_{tg}$) while suppressing the steering reaction torque T to be the target steering reaction torque $T_{tg}$ ($T_{tg}$=0).

<Pattern D: Case where Rear Wheel Tire Steer Angle $δ_r$ and Rear Wheel Braking/Driving Force Difference $F_r$ are State Controlled Variables>

The vehicle motion model in the pattern D is ultimately expressed as an equation (26) by solving equations of vehicle motion expressed as the aforementioned equations (1) and (21) and the following equation (35) for the yaw rate γ and the steering reaction torque T.

[Equation 35]
$$I\frac{dγ}{dt} = (2L_f Y_f - L_r Y_r) - T_r \frac{F_r}{2} \quad (35)$$

[Equation 36]
$$\begin{bmatrix} δ_r \\ F_r \end{bmatrix} = E^{-1} \begin{bmatrix} γ \\ T \end{bmatrix} \quad (36)$$

Here, $E^{-1}$ is the inverse matrix of a matrix E, and the matrix E is expressed as the following equation (37).

[Equation 37]
$$E = \frac{1}{1+S_t V^2}\begin{bmatrix} E11 & E12 \\ E21 & E22 \end{bmatrix} \quad (37)$$

Moreover, in the equation (37), E11, E12, E21, and E22 are matrix coefficients, and they are expressed as the following equations (38) to (41), respectively.

[Equation 38]
$$E11 = -\frac{V}{L} \quad (38)$$

[Equation 39]
$$E12 = \frac{-VT_r(K_f + K_r)}{4L^2 K_f K_r} \quad (39)$$

[Equation 40]
$$E21 = \frac{-MV^2 t L_r}{L^2} \quad (40)$$

[Equation 41]
$$E22 = \frac{-tT_r(MV^2 - 2LK_r)}{4L^2 Kr} \quad (41)$$

The equation (36) indicates that it is possible to perform motion control with two degrees of freedom in which the yaw rate γ and the steering reaction torque T are independently controlled by the rear wheel tire steer angle $δ_r$ and the rear wheel braking/driving force difference $F_r$ as the state controlled variables, respectively.

In other words, the ECU 100 calculates the rear wheel tire steer angle $δ_r$ and the rear wheel left-right braking/driving force difference $F_r$ for obtaining the target yaw rate $γ_{tg}$ and the target steering reaction torque $T_{tg}$ with reference to the vehicle motion model represented by the equation (36) in the step S110 in the LKA control. The obtained rear wheel tire steer angle $δ_r$ is used for the tire steer angle control using the ARS actuator 800 in the step S113, as the target rear wheel tire steer angle $δ_{rtg}$ which is the target value of the rear wheel tire steer angle without change.

On the other hand, the left rear wheel braking/driving force $F_{rl}$ and the right rear wheel braking/driving force $F_{rr}$ are determined so as to satisfy the obtained rear wheel braking/driving force $F_r$. Here, the left rear wheel braking/driving force $F_{rl}$ and the right rear wheel braking/driving force $F_{rr}$ which satisfy the obtained rear wheel braking/driving force $F_r$ are not unique or not unambiguous; however, as long as they satisfy the rear wheel braking/driving force difference $F_r$, it is possible to realize the desired yaw rate γ (γ=$γ_{tg}$) while suppressing the steering reaction torque T to be the target steering reaction torque $T_{tg}$ ($T_{tg}$=0).

As described above, the value of the braking/driving force to act on each wheel for realizing the front wheel braking/driving force difference $F_f$ or the rear wheel braking/driving force difference $F_r$ calculated on the basis of the vehicle motion model in each pattern described above is not unique or not unambiguous. That is because the braking/driving force difference can be provided by the driving force, or by the braking force, or by both the driving force and the braking force.

Thus, the ECU 100 applies the following rules (a) to (d) when determining the target braking/driving force of each wheel which satisfies the calculated braking/driving force difference:

(a) the driving force is prioritized over the braking force;
(b) the sum value of the braking/driving forces matches the driver's intention;
(c) the driving force is applied if the braking apparatus is worn; and
(d) the sum value of the braking/driving forces matches the slope of the road surface.

The rule (a) is a priority measure not to promote the wearing of the braking apparatus 620 of each wheel. The adjustment of the braking/driving force in the rule (a) is one example of the operation corresponding to claim 9 in this application.

The rule (b) is to set the sum value of the braking/driving forces to be the driving force if the driver has the intention to accelerate, and to be the braking force if the driver has the intention to decelerate. The rule (b) is applied on the basis of the driver's intention judged in the step S107 in FIG. 2. Incidentally, the adjustment of the braking/driving force in the rule (b) is one example of the operation corresponding to claim 8 in this application.

The rule (c) is a priority measure not to promote the wearing any longer for the wheel in which the braking apparatus 620 is worn. The rule (c) is applied on the basis of the wearing state of each wheel detected in the step S108 in FIG. 2.

The rule (d) is to set the sum value of the braking/driving forces to be the driving force if the driving route has an ascent, and to be the braking force if the driving route has a descent. The rule (d) is applied on the basis of the road surface state detected in the step S109 in FIG. 2. Incidentally, the adjustment of the braking/driving force in the rule (d) is one example of the operation corresponding to claim 10 in this application.

As explained above, according to the LKA control in the embodiment, the steering reaction torque T generated in making the vehicle 10 follow the target driving route is suppressed in real time to the target steering reaction torque $T_{tg}$ by the tire steer angle control of either one of the front and rear wheels and the braking/driving force control of either one of the front and rear wheels which realize the following to the target driving route. At this time, the suppression of the steering reaction torque T is realized without the operations of the EPS actuator 600 as a steering torque control device, i.e. a device which interferes with the driver's steering operation. Therefore, the measure of suppressing the steering reaction torque T can preferably reduce the uncomfortable feeling given to the driver without interfering with the driver's steering operation.

Moreover, particularly in the embodiment, since the target steering reaction toque $T_{tg}$ is the zero value, which indicates that the uncomfortable feeling given to the driver can be within an acceptable range in advance, the following to the target driving route is realized without the driver applying a steering retention torque in practice. In other words, preferably hands-free driving can be realized.

Incidentally, considering that the steering torque control device is not necessary for the control of the steering reaction torque, the steering torque control device installed in the vehicle does not have to be an electronically-controlled power steering apparatus represented by the EPS actuator 500 in the embodiment or the like. Incidentally, plainly speaking, it may be a hydraulically-controlled power steering apparatus.

<2: Second Embodiment>

Regarding the technical idea of the present invention in which the vehicle state quantity (here, the yaw rate γ) and the steering reaction torque are controlled to have the desired values and the vehicle motion control with two degrees of freedom is realized by using the tire steer angle and the braking/driving force as the state controlled variables, it can be also applied even if there is a disturbance.

As a type of the disturbance, there is μ-split braking. The μ-split braking means braking performed in a case where the left and right wheels are in contact with road surfaces with different friction coefficients. If the μ-split braking is necessitated, the difference in the friction coefficient of the road surface causes an unintended braking/driving force difference between the left and right wheels. Thus, if no measures are taken, the braking/driving force difference between the left and right wheels causes the moment in the turning direction of the vehicle 10 and reduces the controllability of the vehicle motion.

On the other hand, considering that the μ-split braking causes the left-right braking/driving force difference as described above, the vehicle behavior during the μ-split braking can be stabilized by applying the concept of the present invention. Particularly in the embodiment, focusing on that the left-right braking/driving force difference $F_f$ of the front wheels is greater than the left-right braking/driving force difference $F_r$ of the rear wheels in the μ-split braking, the vehicle motion control with two degrees of freedom as in the first embodiment is realized in the μ-split braking by providing a relative relation between: the front wheel left-right braking/driving force difference $F_f$; and the rear wheel left-right braking/driving force difference $F_r$ and a front-rear wheel tire steer angle difference $δ_d$ ($δ_d=δ_f-δ_r$) for setting the yaw rate γ and the steering reaction torque T to have the desired values, as the vehicle motion model (hereinafter referred to as a "μ-split braking vehicle motion model" as occasion demands).

Figure 5:
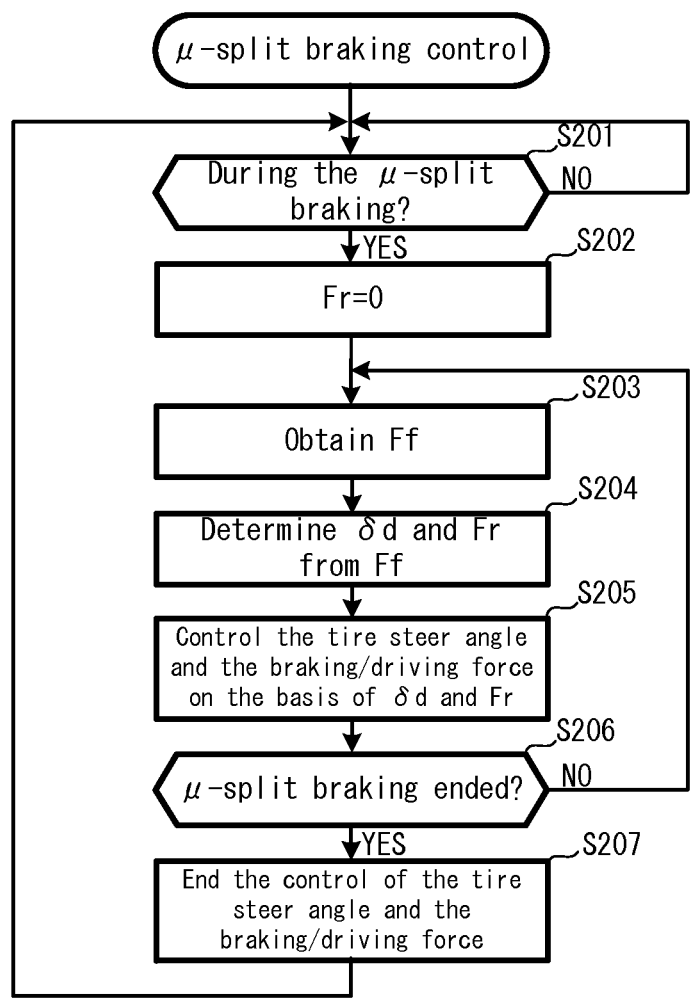
FIG. 5 is a flowchart showing μ-split braking control in a second embodiment of the present invention.

The stabilization of the vehicle behavior in the μ-split braking is realized by μ-split braking control performed by the ECU 100. Now, with reference to FIG. 5, the details of the μ-split braking control will be explained. FIG. 5 is a flowchart showing the μ-split braking control.

In FIG. 5, the ECU 100 judges whether or not the vehicle 10 is during the μ-split braking (step S201). If it is not during the μ-split braking (the step S201: NO), the process is substantially in a standby state in the step S201. Incidentally, the operation in the step S201 is one example of the operations of the "μ-split braking judging device" of the present invention.

On the other hand, if it is during the μ-split braking (the step S201: YES), the ECU 100 temporarily sets the rear wheel left-right braking/driving force difference $F_r$ to be zero (step S202).

Then, the ECU 100 obtains the value of the front wheel left-right braking/driving force difference $F_f$ caused by the μ-split braking (step S203). Incidentally, the value of the front wheel left-right braking/driving force difference $F_f$ is estimated on the basis of the drive state of the front differential 320 for distributing the driving forces of the front wheels. In other words, in the μ-split braking, the rotational speed of the wheel increases on the road surface side with a lower friction coefficient. Since the increase in the rotational speed is unique to an increase in the torque acting on this wheel, the left-right braking/driving force difference can be estimated.

If the front wheel left-right braking/driving force difference is obtained, the ECU 100 determines, from the obtained front wheel left-right braking/driving force difference $F_f$, the front-rear wheel tire steer angle difference $δ_d$ and the rear wheel left-right braking/driving force difference $F_r$ for setting the yaw rate γ and the steering reaction torque T to be the target yaw rate $γ_{tg}$ (here, assumed to be zero) and the target steering reaction torque $T_{tg}$ (here, assumed to be zero), respectively (step S204).

Here, the aforementioned μ-split braking vehicle motion model is used in this step S204. Incidentally, the μ-split braking vehicle motion model will be described later.

If the front-rear wheel tire steer angle difference $δ_d$ and the rear wheel left-right braking/driving force difference $F_r$ are determined, the ECU 100 controls the front wheel tire steer angle $δ_f$ or the rear wheel tire steer angle $δ_r$ or both of them and the driving force distributing apparatus 300 and the ECB 600 so as to obtain the front-rear wheel tire steer angle difference $δ_d$ and the rear wheel left-right braking/driving force difference $F_r$ which are determined (step S205).

After starting the control, the ECU 100 judges whether or not the μ-split braking is ended (step S206), and if the μ-split braking is continued (the step S106: NO), the ECU 100 returns the process to the step S203 and repeats a series of the process operations.

On the other hand, if the μ-split braking is ended (the step S206: YES), the ECU 100 ends the control of the tire steer angle and the braking/driving force in the μ-split braking (step S207), returns the process to the step S201, and repeats a series of the process operations. The μ-split braking is performed as described above.

Now, the μ-split braking vehicle motion model will be explained. The μ-split braking vehicle motion model is given as the following equation (42).

[Equation 42]

$$\begin{bmatrix} δ_d \\ F_r \end{bmatrix} = \begin{bmatrix} F11 \\ F21 \end{bmatrix} F_f \qquad (42)$$

Here, F11 and F12 are matrix coefficients, and they are shown in the following equations (43) and (44), respectively.

[Equation 43]

$$F11 = \frac{-k(K_f + K_r)}{2tK_f K_r} \qquad (43)$$

[Equation 44]

$$F21 = -\frac{1}{T_r}\left(T_f + \frac{2kL}{tT_r}\right) \qquad (44)$$

As described above, in the μ-split braking control, by applying the μ-split braking vehicle motion model shown in the equation (42) to the front wheel left-right braking/driving force difference Ft caused by the μ-split braking, it is possible to derive the front-rear wheel tire steer angle difference $\delta_d$ and the rear wheel left-right braking/driving force difference $F_r$ for setting the yaw rate γ and the steering reaction torque T to be the target yaw rate $\gamma_{tg}$ and the target steering reaction torque $T_{tg}$, respectively.

Thus, by controlling the front wheel tire steer angle $\delta_f$ or the rear wheel tire steer angle $\delta_r$ or both of them and the left front wheel braking/driving force $F_{rl}$ and the right rear wheel braking/driving force $F_{rr}$ such that the front-rear wheel tire steer angle difference $\delta_d$ and the rear wheel left-right braking/driving force difference $F_r$ have the values derived by the μ-split braking vehicle motion model, it is possible to stabilize the vehicle behavior in the μ-split braking.

Incidentally, since the μ-split braking is of course a braking phenomenon, the rear wheel left-right braking/driving force difference $F_r$ derived from the μ-split braking vehicle motion model is desirably realized by controlling the braking force acting on each wheel via the ECB 600.

The present invention is not limited to the aforementioned embodiments, but various changes may be made, if desired, without departing from the essence or spirit of the invention which can be read from the claims and the entire specification. A control apparatus for a vehicle, which involves such changes, is also intended to be within the technical scope of the present invention.

Industrial Applicability

The present invention can be applied, for example, to a vehicle having a function of making a vehicle follow a target driving route.

DESCRIPTION OF REFERENCE CODES

FL, FR, RL, RR wheels
10 vehicle
11 propeller shaft
12 steering wheel
13 upper steering shaft
14 lower steering shaft
15 rack bar
16 steering angle sensor
17 steering torque sensor
100 ECU
200 engine
300 braking/driving force distributing apparatus
310 center differential mechanism
320 front differential mechanism
330 rear differential mechanism
400 VGRS actuator
500 EPS actuator
600 ECB
610 brake actuator
620FL, 620FR, 620RL, 620RR braking apparatus
800 ARS actuator

The invention claimed is:

1. A control apparatus for controlling a vehicle, the vehicle comprising a tire steer angle varying device and a braking or driving force varying device, comprising:
   a setting device for setting a target value of a vehicle state quantity, the vehicle state quantity defining a turning behavior of the vehicle; and
   a determining device for determining state controlled variables, the state controlled variables comprising a target value of a tire steer angle of at least one wheel of the vehicle and target values of the braking or driving forces of a left wheel and a right wheel, respectively,
   wherein the determining device, based on the target value of the vehicle state quantity and a predetermined target value of a steering reaction torque, determines the target value of the tire steer angle for the tire steer angle varying device and determines the respective target values of the braking or driving forces of the left wheel and the right wheel for the braking or driving force varying device.

2. The control apparatus for the vehicle according to claim 1, further comprising a controlling device for performing automatic steering control in which the tire steer angle varying device and the braking or driving force varying device are controlled such that the tire steer angle of front wheels or rear wheels and the left and right braking or driving forces of the front wheels or the rear wheels have the determined target values.

3. The control apparatus for the vehicle according to claim 2, further comprising a detecting device capable of detecting a driver's steering input,
   said controlling device ending the automatic steering control if the steering input is detected in a period of performing the automatic steering control.

4. The control apparatus for the vehicle according to claim 3, wherein the steering input is at least one of a driver steering torque which is greater than or equal to a standard value and a driver steering angle which is greater than or equal to a standard value.

5. The control apparatus for the vehicle according to claim 1, wherein the target value of the steering reaction torque is less than or equal to a standard value.

6. The control apparatus for the vehicle according to claim 1, wherein the vehicle state quantity is a yaw rate.

7. The control apparatus for the vehicle according to claim 1, wherein said determining device determines the target values of the left and right braking or driving forces on the basis of a kingpin offset of the steered wheels.

8. The control apparatus for the vehicle according to claim 1, further comprising a driver's intention specifying device for specifying a driver's intention associated with a motion state of the vehicle,
   said determining device adjusting the determined target values of the left-right braking or driving forces in accordance with the specified driver's intention.

9. The control apparatus for the vehicle according to claim 1, wherein said determining device determines the target values of the left and right braking or driving forces such that a driving force is prioritized over a braking force.

10. The control apparatus for the vehicle according to claim 1, further comprising a road surface state specifying device for specifying a state of a road surface,
    said determining device adjusting the determined target values of the left and right braking or driving forces in accordance with the specified state of the road surface.

11. The control apparatus for the vehicle according to claim 1, wherein
    the braking or driving force varying device can change a difference between the respective target values of the braking or driving force of the left and right wheels in each of front wheels and rear wheels,
    said control apparatus for the vehicle further comprises a μ-split braking judging device for judging whether or not the vehicle is during μ-split braking, and
    said determining device determines the target values of the tire steer angle of the front wheels, the tire steer angle of the rear wheels, and the braking or driving forces of the rear wheels, which correspond to the braking or driving force difference of the front wheels generated during the µ-split braking, on the basis of a µ-split braking model for defining a relation between: a tire steer angle difference of the front wheels and the rear wheels; and the difference between respective target values of the braking or driving force of the left and right wheels of the rear wheels and the difference between respective target values of the braking or driving force of the left and right wheels of the front wheels, which is set in advance such that the steering reaction torque and the vehicle state quantity are less than or equal to standard values, if it is judged that the vehicle is during the µ-split braking.

12. The control apparatus for the vehicle according to claim 1, wherein the determining device uses a vehicle motion model, the vehicle motion model provides a predetermined correlation between values of the state controlled variables and a value of the vehicle state quantity.

* * * * *